(12) United States Patent
Nishimura

(10) Patent No.: US 7,676,013 B2
(45) Date of Patent: Mar. 9, 2010

(54) DATA TRANSFER SYSTEM AND READJUSTMENT CONTROL METHOD FOR USE WITH THE SYSTEM

(75) Inventor: Takahiro Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 1101 days.

(21) Appl. No.: 10/889,184

(22) Filed: Jul. 13, 2004

(65) Prior Publication Data

US 2005/0013393 A1 Jan. 20, 2005

(30) Foreign Application Priority Data

Jul. 17, 2003 (JP) .............................. 2003-275731

(51) Int. Cl.
*H03D 3/24* (2006.01)
(52) U.S. Cl. ...................................................... 375/376
(58) Field of Classification Search ................ 375/354, 375/355, 357, 362, 365, 366, 371, 373, 376; 455/180.3, 260; 714/703, 707, 798, 799; 327/141, 146, 147, 148, 149, 150, 156, 157, 327/158, 159
See application file for complete search history.

(56) References Cited

U.S. PATENT DOCUMENTS

| | | | |
|---|---|---|---|
| 4,029,900 A | 6/1977 | Addeo | |
| 4,763,324 A | 8/1988 | Schwierz | |
| 6,587,983 B1 * | 7/2003 | Nakayama | ................. 714/736 |
| 2002/0000856 A1 * | 1/2002 | Jung | ........................... 327/158 |
| 2003/0214280 A1 * | 11/2003 | Gauthier et al. | .......... 324/76.53 |
| 2004/0012420 A1 * | 1/2004 | Roy et al. | .................... 327/149 |
| 2004/0017873 A1 * | 1/2004 | Chong et al. | ................ 375/376 |
| 2004/0151272 A1 * | 8/2004 | Kenney et al. | .............. 375/376 |

FOREIGN PATENT DOCUMENTS

| | | |
|---|---|---|
| EP | 0 923 207 A2 | 6/1999 |
| JP | 6-509458 A | 10/1994 |
| JP | 6-311126 A | 11/1994 |
| JP | 6-511121 A | 12/1994 |
| JP | H07-084946 | 3/1995 |
| JP | 11-285060 A | 10/1999 |
| JP | 2000-163963 | 6/2000 |

* cited by examiner

*Primary Examiner*—Sam K Ahn
(74) *Attorney, Agent, or Firm*—Sughrue Mion, PLLC

(57) ABSTRACT

An object of the present invention is to provide a data transfer system capable of maintaining synchronization of the data during the operation of apparatus by performing the periodical adjustment for a DLL circuit without using a method of 8B10B. In a transmitting apparatus, a control portion switches a selector to start a readjustment for the DLL circuit in a receiving apparatus, if a counter indicates a readjustment interval time. In performing there adjustment for the DLL circuit, a pattern generator sends a pattern making a signal waveform a stationary wave through the selector for a certain time, and if the signal is made stationary, a readjustment pattern is sent to the DLL circuit. The DLL circuit resets the sampling timing, based on this readjustment pattern. The selector switches the normal data A and the readjustment pattern to be sent to the DLL circuit.

35 Claims, 20 Drawing Sheets

DATA TRANSFER SYSTEM AND READJUSTMENT CONTROL METHOD FOR USE WITH THE SYSTEM

BACKGROUND OF THE INVENTION

1. Field of the Invention

The present invention relates to a data transfer system and a readjustment control method for use with the system, and more particularly to readjusting the sampling timing for a DLL (Delay Locked Loop) circuit.

2. Description of the Prior Art

In recent years, a DLL circuit has been incorporated for maintaining synchronization of data. Conventionally, if an input signal was taken in at a false timing before the phase adjustment of the DLL circuit at the time of turning on the power or returning from the power down operation, the internal circuits possibly might cause a malfunction.

A method for solving this problem has been proposed in which in an integrated circuit device having a self timing control circuit for generating an input take-in timing signal in phase adjustment with the internal clock, during the period of phase adjustment of the self timing control circuit, input signals such as a command input signal, an address input signal, a data input signal and the like, supplied externally to an input circuit, are inhibited from being taken into the inside (e.g., refer to Japanese Patent Laid-Open No. 2000-163963).

In this case, when the phase adjustment of the self timing control circuit is ended to some extent, the operation of taking in the input signals using an input take-in timing signal in the input circuit are permitted. To perform this operation, the input circuit generates an input take-in control signal, employing a lock-on signal, an adjust signal or an input stop signal for the DLL circuit, for example.

BRIEF SUMMARY OF THE INVENTION

In the conventional DLL circuit, to prevent an input signal from being taken in at a false timing before the phase adjustment of the DLL circuit at the time of turning on the power or returning from the power down operation, and to prevent the internal circuits from causing a malfunction, the input signal supplied externally to the input circuit is inhibited from being taken into the inside during the period of phase adjustment in the self timing control circuit, as disclosed in the Japanese Patent Laid-Open No. 2000-163963.

However, in the conventional DLL circuit, when there are large variations in the temperature or voltage along with the higher speed of the data transfer, the sampling timing is deviated during the operation of apparatus, with a possibility of causing a malfunction. That is, maintaining of the synchronization of data in the data transfer is not assured.

Also, even if the same value (e.g., "00 . . . 00") in the data continues, an error is not detected within the DLL circuit, so that the sampling timing is deviated. The conventional method of 8B10B can prevent this phenomenon, but has a worse transfer efficiency because the redundant data is added (20% of transfer data is excess data).

Thus, it is an object of the present invention to solve the above-mentioned problem, and provide a data transfer system, and a readjustment control method for use with the system in which maintaining synchronization of data can be performed during the operation of apparatus without using the method of 8B10B.

The present invention provides a data transfer system comprising a transmitting apparatus, and a receiving apparatus for maintaining synchronization of data from the transmitting apparatus, using a DLL (Delay Locked Loop) circuit, wherein the readjustment of the DLL circuit is periodically performed.

This invention provides a readjustment control method for a data transfer system comprising a transmitting apparatus, and a receiving apparatus for maintaining synchronization of data from the transmitting apparatus, using a DLL (Delay Locked Loop) circuit, wherein the readjustment of the DLL circuit is periodically performed.

This invention provides a computer program for implementing a readjustment control method for a data transfer system comprising a transmitting apparatus, and a receiving apparatus for maintaining synchronization of data from the transmitting apparatus, using a DLL (Delay Locked Loop) circuit, the program comprising a process for periodically performing the readjustment of the DLL circuit.

That is, the data transfer system of the invention periodically performs the readjustment of sampling time for the DLL (Delay Locked Loop) circuit in the receiving apparatus to maintaining synchronization of the data. In the data transfer system of the invention, the outline of operation has a feature of switching the normal data and the readjustment pattern based on the counter indicating the periodic readjustment interval. Hence, in the data transfer system of the invention, the DLL circuit in the receiving apparatus can readjust the sampling timing again, based on the readjustment pattern periodically transmitted.

At present, the data transfer through various interfaces is increasingly faster in the DLL circuit, and there are large variations in the temperature or voltage, so that the sampling timing for maintaining synchronization of the data is deviated, possibly causing a malfunction of the internal circuits. In the data transfer system of the invention, the above operation is performed to solve this problem.

Also, with the readjustment control method for the DLL circuit according to the invention, the DLL circuit has a function of inhibiting transmission of the normal data during the readjustment and a function of checking an output of the DLL circuit after the readjustment. If the check result is success, the system returns to the normal operation, or if it is failure, the readjustment is retried.

Thereby, in the data transfer system of the invention, the periodical adjustment for the DLL circuit is performed, making it possible to maintaining synchronization of the data during the operation of apparatus. In the data transfer system of the invention, the readjustment for the DLL circuit is periodically performed, causing a lower performance, but the lower performance is suppressed to the utmost by appropriately specifying the readjustment interval, pattern sending period, hold period, and monitoring timer interval.

The invention with the following configuration and operation has the advantage of performing the periodical adjustment for the DLL circuit without using the method of 8B10B, and maintaining synchronization of the data during the operation of apparatus.

DETAILED DESCRIPTION OF THE PREFERRED EMBODIMENTS

Figure 1:
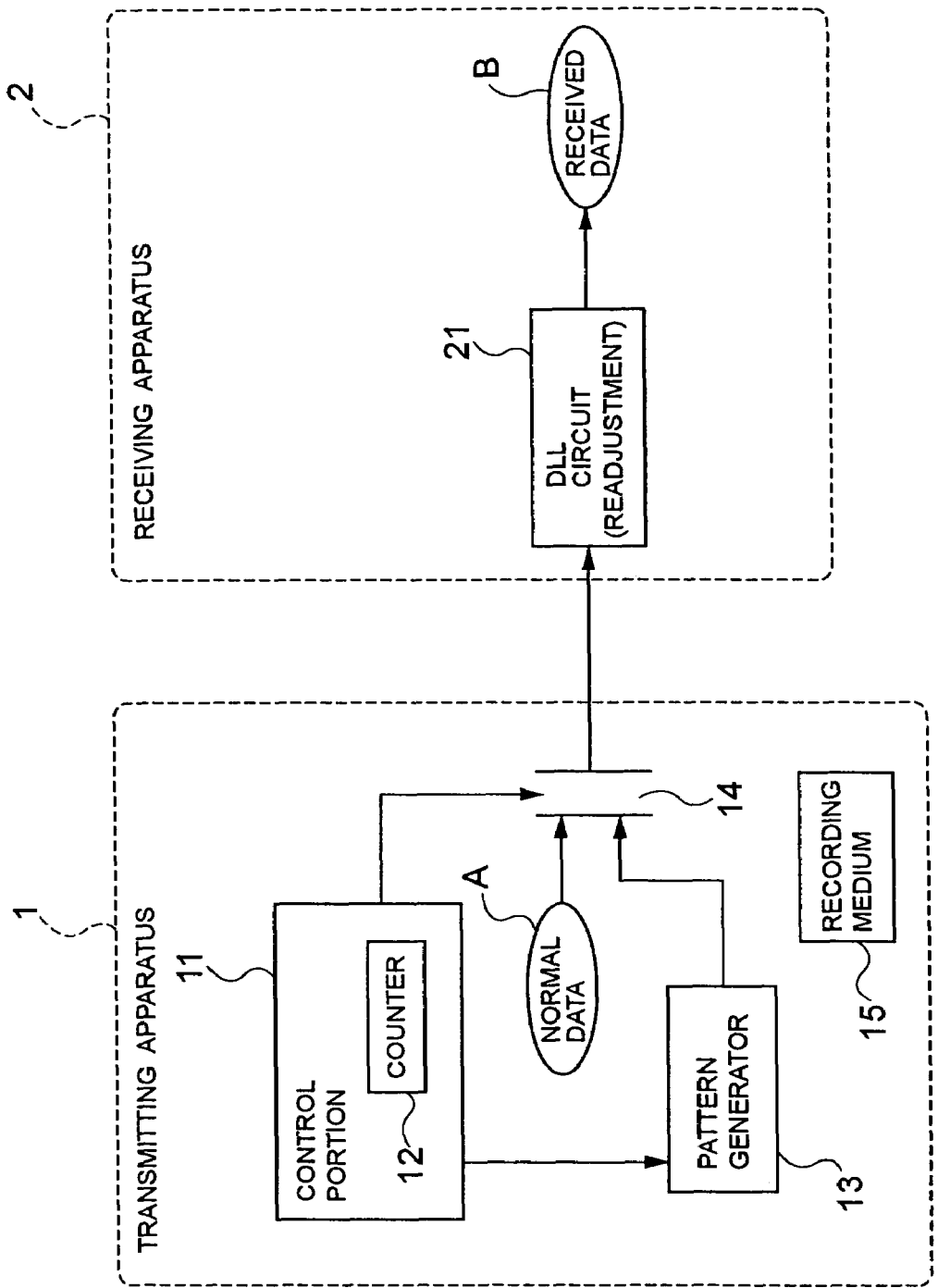
FIG. 1 is a block diagram showing a configuration example of a data transfer system according to an embodiment of the present invention.

The preferred embodiments of the present invention will be described below in detail with reference to the accompanying drawings. FIG. 1 is a block diagram showing a configuration example of a data transfer system according to an embodiment of the invention. In FIG. 1, the data transfer system according to the embodiment of the invention comprises a transmitting apparatus 1 and a receiving apparatus 2.

The receiving apparatus 2 comprises a DLL (Delay Locked Loop) circuit 21 for maintaining synchronization of data. The transmitting apparatus 1 comprises a control portion 11 having a counter 12 indicating a readjustment interval time, a pattern generator 13 for generating a readjustment pattern of the DLL circuit 21, a selector 14 for selecting the normal data A or the readjustment pattern of the DLL circuit 21 from the pattern generator 13, and a recording medium 15 for storing a program (executable on the computer) to realize the operation of each portion.

A pattern generation process for generating the readjustment pattern of the DLL circuit 21 in the pattern generator 13 and a switching process in the selector 14 are performed under the directive control of the control portion 11. However, if the pattern generator 13 always generates the readjustment pattern of the DLL circuit 21 at a constant timing, the directive control of the control portion 11 may be omitted. In this case, the control portion 11 may switch the selector 14 in response to the timing for generating the pattern in the pattern generator 13. Also, a method for readjusting the DLL circuit 21 may use a technique as disclosed in Japanese Patent Laid-Open No. 7-84946.

Thereby, in the embodiment of the invention, it is possible to maintain the synchronization of the data during the operation of the apparatus by making the periodical adjustment of the DLL circuit 21. In the embodiment of the invention, the adjustment of the DLL circuit 21 is periodically made, causing a lower performance. However, the lower performance can be suppressed to the utmost by specifying the readjustment interval, the pattern sending period, the hold period, and the monitoring timer interval appropriately.

EXAMPLE 1

Figure 2:
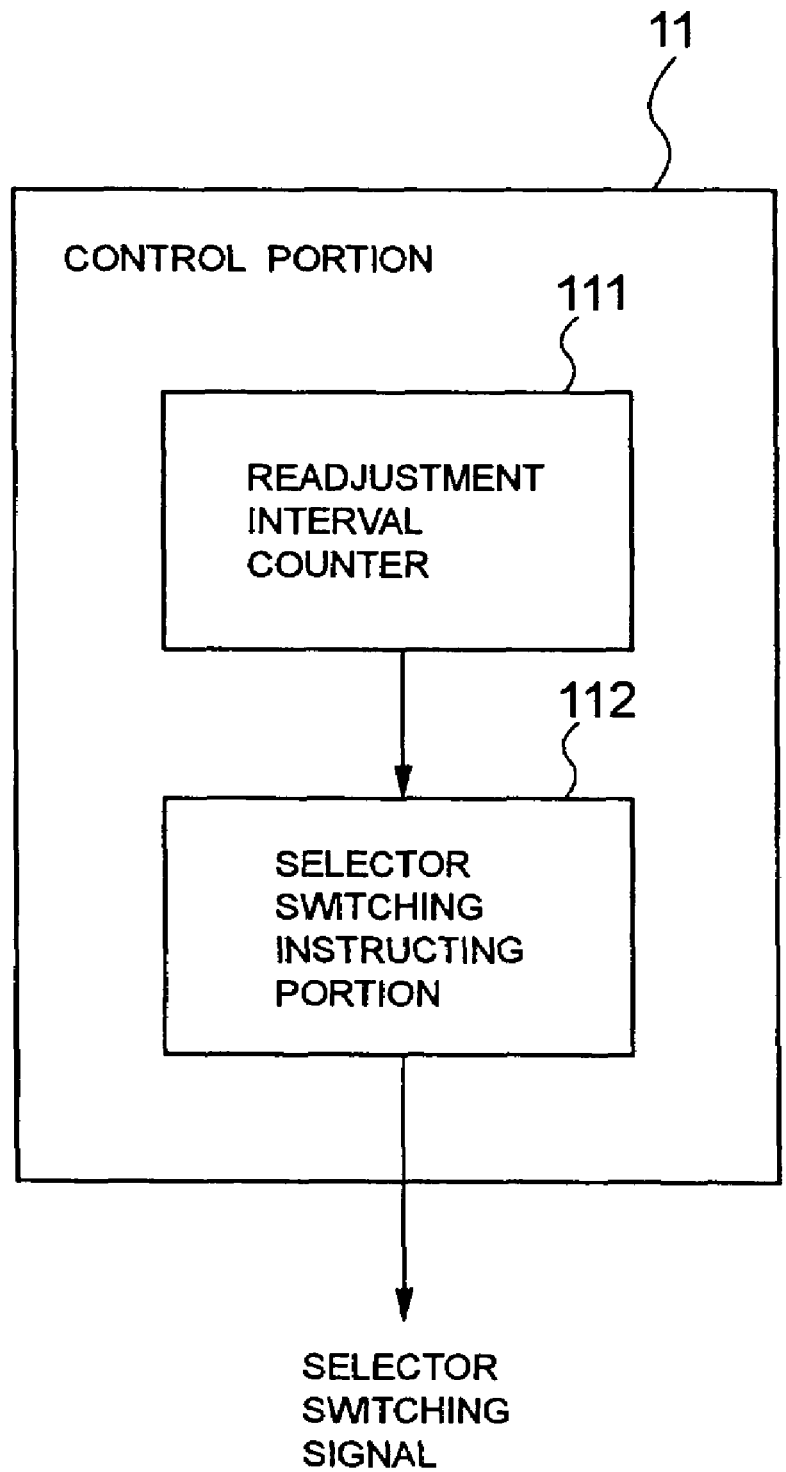
FIG. 2 is a block diagram showing the configuration of a control portion within a transmitting apparatus in a first example of the invention.

FIG. 2 is a block diagram showing the configuration of a control portion within a transmitting apparatus in a first example of the invention. The data transfer system in the first example of the invention has the same configuration as the data transfer system according to the embodiment of the invention as shown in FIG. 1. Also, the transmitting apparatus 1 and the receiving apparatus 2 have the same configuration as in the embodiment of the invention.

In FIG. 2, the control portion 11 is composed of a readjustment interval counter 111 and a selector switching instructing portion 112. The readjustment interval counter 111 (corresponding to the counter 12 of FIG. 1) counts the preset readjustment interval, and notifies its count value to the selector switching instructing portion 112. The selector switching instructing portion 112 generates a selector switching signal to the selector 14, based on the count value from the readjustment interval counter 111.

Figure 3:
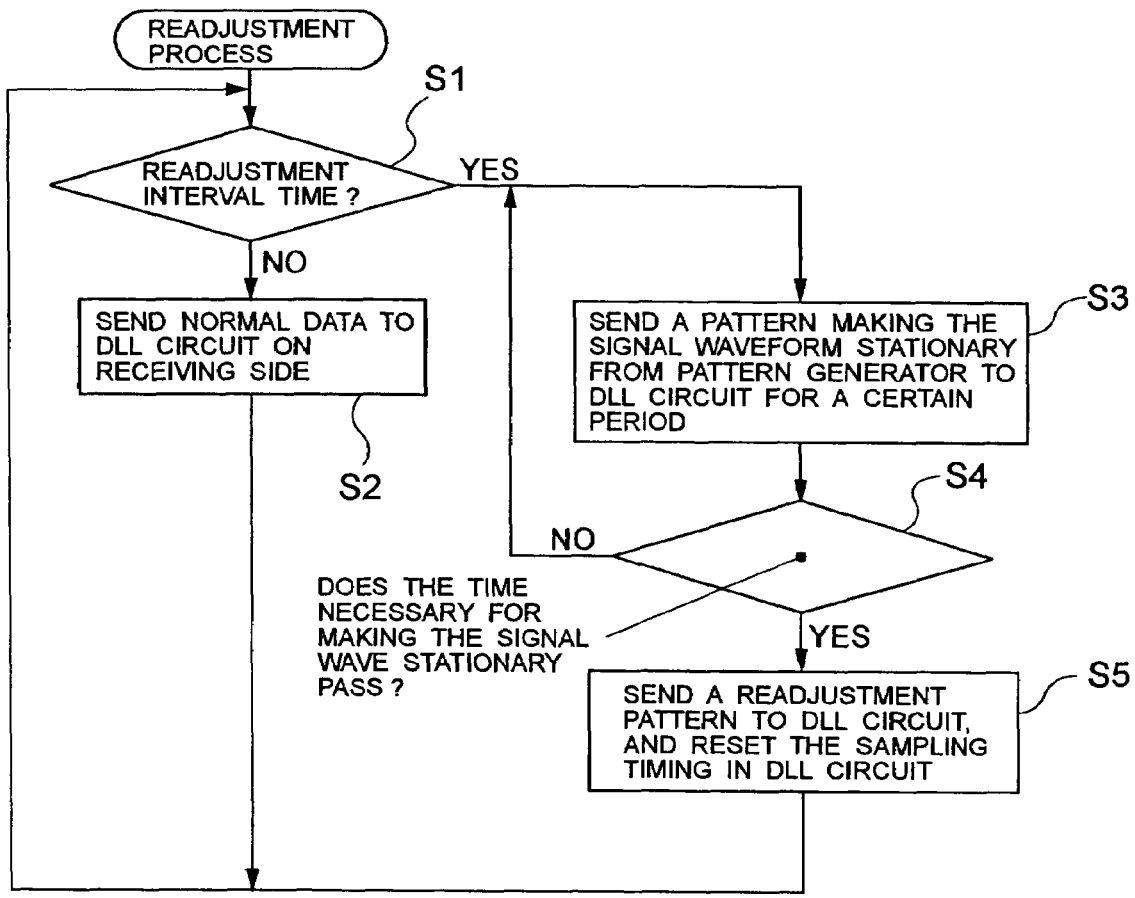
FIG. 3 is a flowchart showing a readjustment process of sampling time in the first example of the invention.

FIG. 3 is a flowchart showing a readjustment process of sampling time in the first example of the invention. Referring to FIGS. 1 to 3, the readjustment process of sampling time in the first example of the invention will be described below.

If the readjustment for the DLL circuit 21 is not made (step SI in FIG. 3), the normal data A is sent to the DLL circuit 21 of the receiving apparatus 2 (step S2), so that the synchronous data (received data B) is received by the receiving apparatus 2.

However, since the normal operation is not always made due to causing a deviation of the sampling time in the DLL circuit 21, the readjustment of sampling time for the DLL circuit 21 is performed at every interval specified in the readjustment interval counter 111 (counter 12 in FIG. 1) in this example.

As a specific readjustment method for sampling time, the pattern generator 13 sends a pattern to the DLL circuit 21 to make the signal waveform a stationary wave for a certain period required to be stationary (step S3). If the time required to make the waveform stationary has passed (step S4), the pattern generator 13 sends a readjustment pattern to the DLL circuit 21 and resets the sampling timing in the DLL circuit 21 (step S5). Herein, the stationary pattern or the readjustment pattern is changeable at will. Also, the sending period of stationary pattern is changeable.

The operation required in readjusting the DLL circuit 21 is only to allow the selector 14 to switch the normal data A and the readjustment pattern to be sent to the DLL circuit 21 in the receiving apparatus 2. Accordingly, if the counter 12 in the control portion 11 indicates the readjustment interval time, the selector 14 is switched to start the readjustment for the DLL circuit 21. The readjustment interval specified by the counter 12 may be settable at will. If the readjustment for the DLL circuit 21 is ended, the selector 14 is switched to the normal data A, the counter 12 is reset and resumes to count up.

EXAMPLE 2

Figure 4:
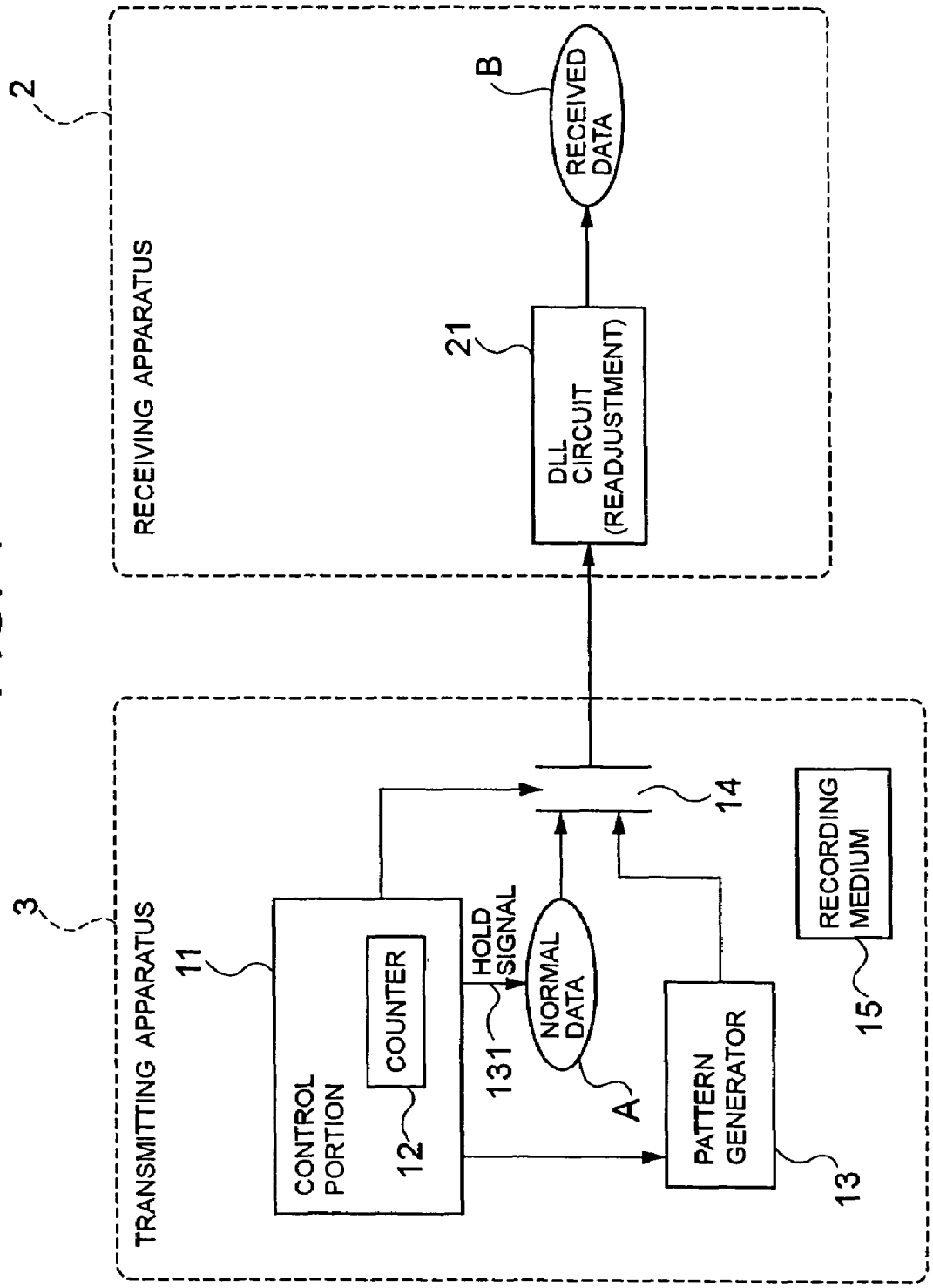
FIG. 4 is a block diagram showing a configuration example of the data transfer system in a second example of the invention.

FIG. 4 is a block diagram showing a configuration example of the data transfer system in a second example of the invention. In FIG. 4, the data transfer system in the second example of the invention has the same configuration as the data transfer system according to the embodiment of the invention as shown in FIG. 1, except that a hold signal 131 is sent from the control portion 11 of the transmitting apparatus 3 to suspend transmission of the normal data A, and after holding the normal data A, the readjustment pattern from the pattern generator 13 is transmitted. In FIG. 4, the same components as in FIG. 1 are designated by the same numerals. The operation of the same components is the same as in the embodiment of the invention.

Figure 5:
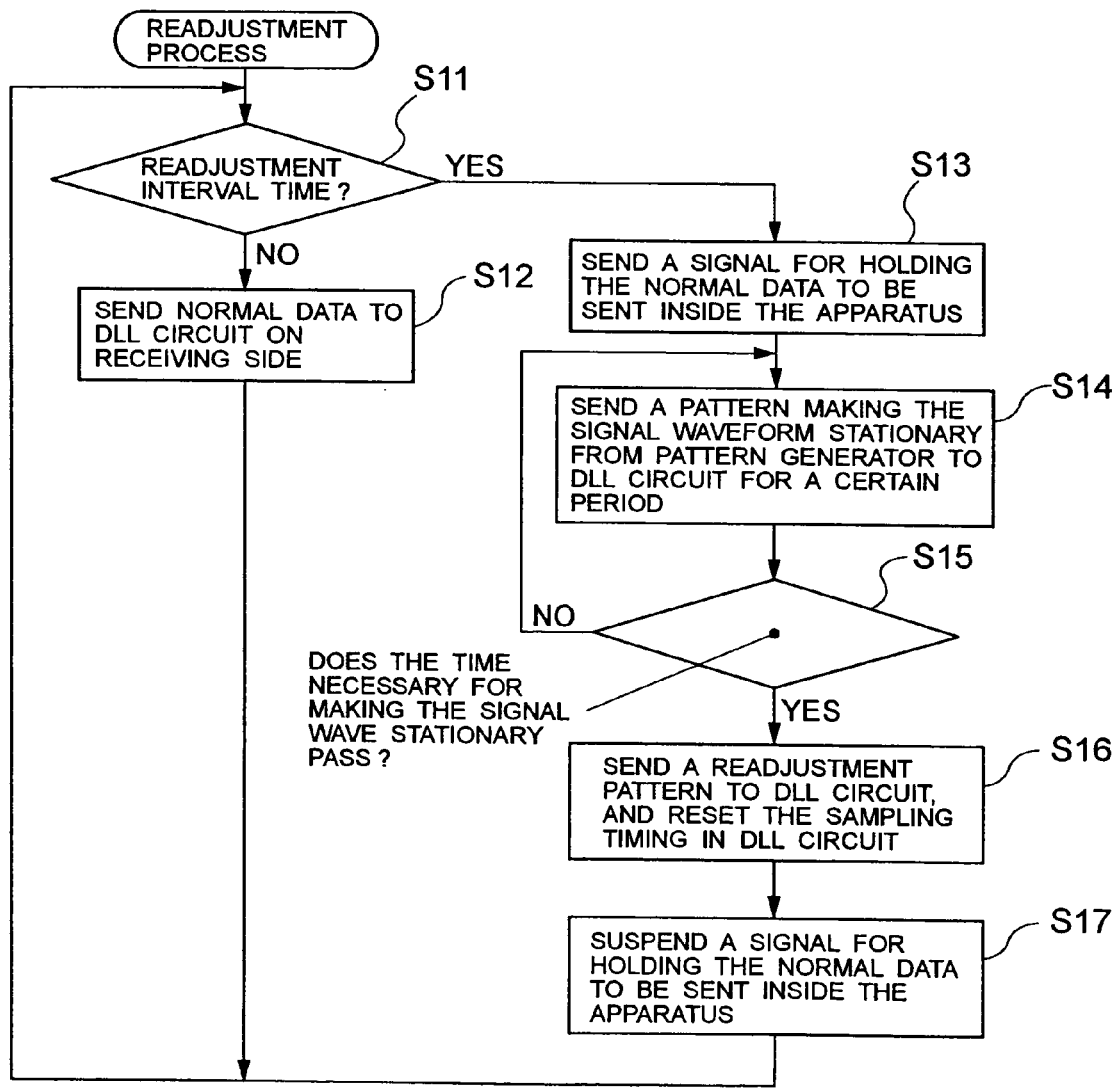
FIG. 5 is a flowchart showing the readjustment process of sampling time in the second example of the invention.

FIG. 5 is a flowchart showing the readjustment process of sampling time in the second example of the invention. Referring to FIGS. 4 and 5, the readjustment process of sampling time in the second example of the invention will be described below. However, the steps S11, S12, S14 to S16 in FIG. 5, which are the same as the steps S1 to S5 in FIG. 3, are not described here. Also, the configuration of the control portion 11 is the same as that of the control portion 11 in the first example of the invention as shown in FIG. 2.

When the normal data A is transmitted from the transmitting apparatus 3 while the selector 14 is switched to transmission of the readjustment pattern from the pattern generator 13, the receiving apparatus 2 can not receive the normal data A.

Thus, the control portion 11 sends out a hold signal 131 for holding the normal data A to be transmitted from inside the transmitting apparatus 3 while the DLL circuit 21 is being readjusted (the selector 14 selects the output of the pattern generator 13) (step S13 in FIG. 5).

Originally, the collision between the normal data A and the readjustment pattern does not occur owing to the selector 14, but this function using the holding signal 131 prevents the operation of passing the normal data A from inside the transmitting apparatus 3 while the DLL circuit 21 is being readjusted. Also, the hold period of the hold signal 131 continues until sending the readjustment pattern to the DLL circuit 21 is ended (steps S14 to S17 in FIG. 5), but may be arbitrarily set up.

EXAMPLE 3

Figure 6:
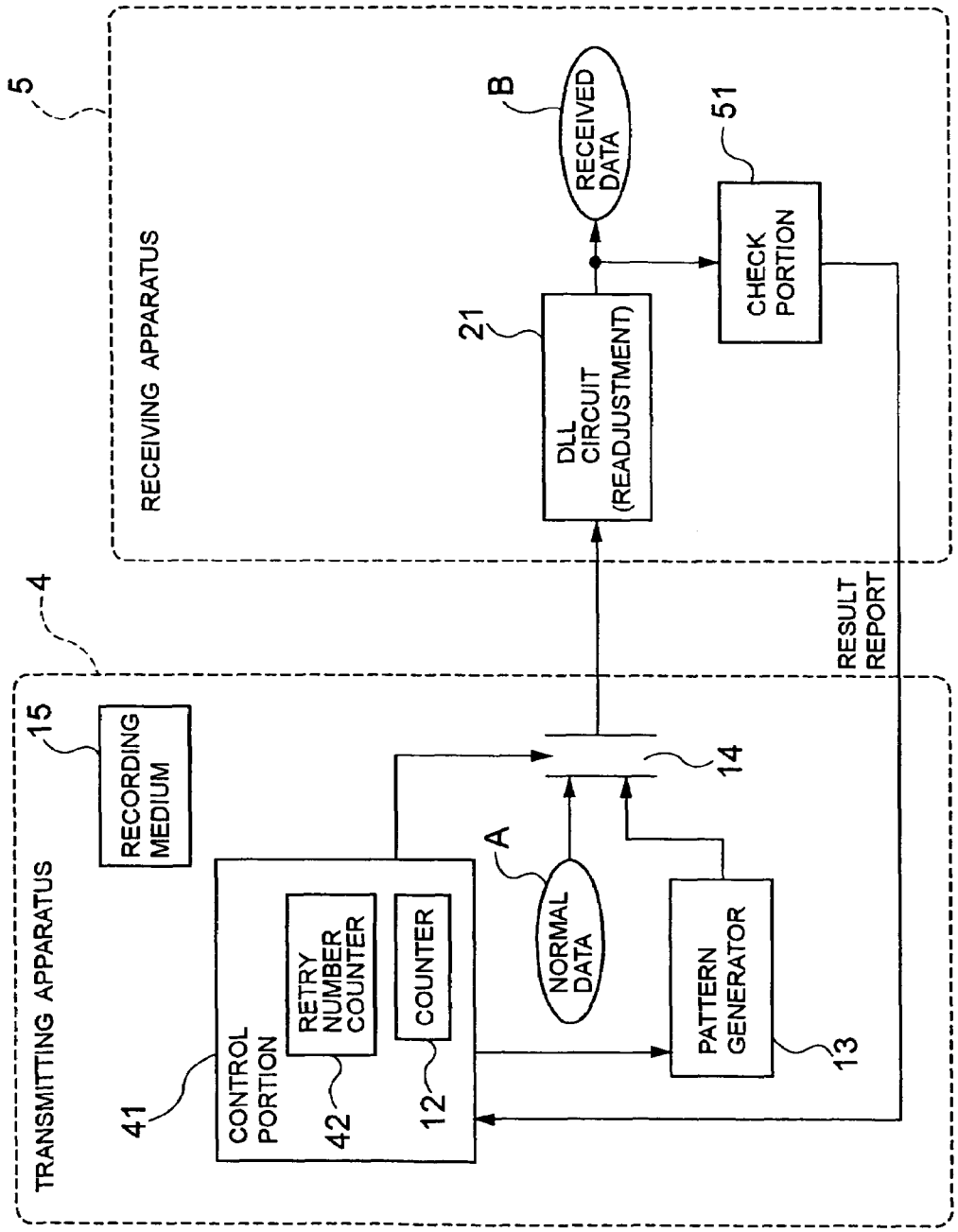
FIG. 6 is a block diagram showing a configuration example of the data transfer system in a third example of the invention.

FIG. 6 is a block diagram showing a configuration example of the data transfer system in a third example of the invention. In FIG. 6, the data transfer system in the third example of the invention has the same configuration as the data transfer system according to the embodiment of the invention as shown in FIG. 1, except that a retry number counter 42 is provided in a control portion 41 of the transmitting apparatus 4 and a check portion 51 is provided in the receiving apparatus 5. In FIG. 6, the same components as in FIG. 1 are designated by the same numerals. The operation of the same components is the same as in the embodiment of the invention.

The check portion 51 detects an error during the readjustment of the DLL circuit 21, its result being reported to the control portion 41 of the transmitting apparatus 4. The control portion 41 determines whether to transmit the normal data A or the readjustment pattern of the DLL circuit 21, based on its report and the count value of the retry number counter 42 on the basis of the reports.

Figure 7:
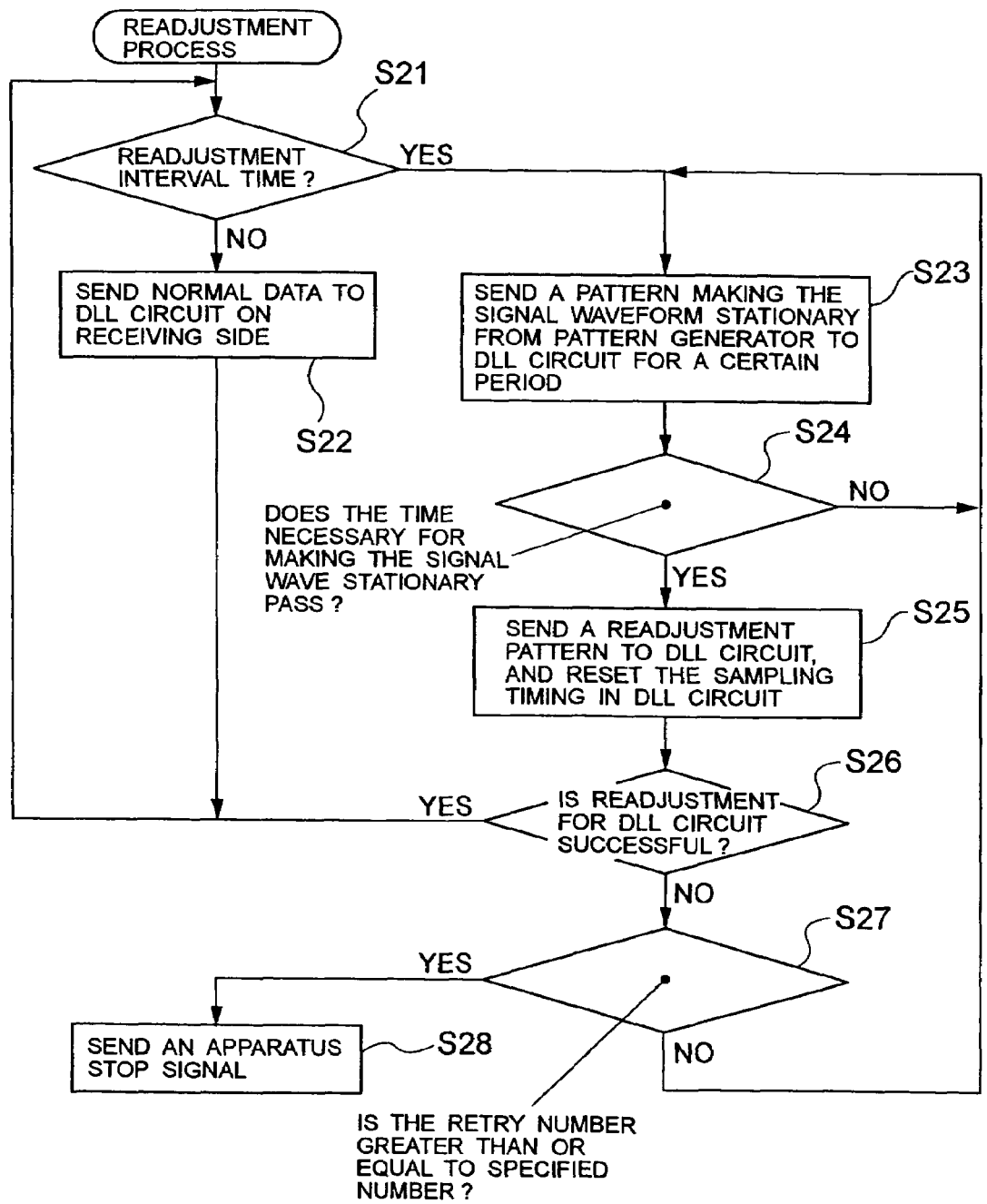
FIG. 7 is a flowchart showing the readjustment process of sampling time in the third example of the invention.

FIG. 7 is a flowchart showing the readjustment process of sampling time in the third example of the invention. Referring to FIGS. 6 and 7, the readjustment process of sampling time in the third example of the invention will be described below. However, the steps S21 to S25 in FIG. 7, which are the same as the steps S1 to S5 in FIG. 3, are not described here. Also, the configuration of the control portion 41 is the same as that of the control portion 11 in the first example of the invention as shown in FIG. 2.

The check portion 51 of the receiving apparatus 5 checks the output data of the DLL circuit 21 to detect whether the readjustment of the DLL circuit 21 is a success or failure during the readjustment, or immediately after the readjustment. Since the check portion 51 reports the detection result to the control portion 41, the transmitting apparatus 4 determines whether to resume the normal operation or retry the readjustment, and execute the resumption of the normal operation or the retry of readjustment (step S26 in FIG. 7).

In the control portion 41 of the transmitting apparatus 4, if the failure in the readjustment of the DLL circuit 21 is reported based on the detection result from the check portion 51, requiring the retry of readjustment, it is determined whether or not the retry number of readjustments is greater than or equal to the specified preset number (step S27 in FIG. 7). The control portion 41 sends out an apparatus stop signal to stop the transmitting apparatus 4 and the receiving apparatus 5 (step S28 in FIG. 7), if the retry number is greater than or equal to the specified number. The control portion 41 executes to retry the readjustment of the DLL circuit 21, if the retry number is not greater than or equal to the specified number.

The reason why the transmitting apparatus 4 and the receiving apparatus 5 are stopped by sending the apparatus stop signal is that it is not possible to distinguish in which of the transmitting apparatus 4 and the receiving apparatus 5 a failure occurs. Basically, if the transmitting apparatus 4 is stopped, the receiving apparatus 5 receives no data, and stops to operate.

In this example, owing to addition of these functions, the readjustment for the DLL circuit 21 is securely performed, unlike the first example of the invention in which after the readjustment pattern for the DLL circuit 21 is sent out, the operation returns to transmission of the normal data A, supposing that the readjustment for the DLL circuit 21 is ended. That is, the reliability is enhanced in the third example of the invention.

Also, the retry number of readjustments for the DLL circuit 21 may be set up. When the readjustment for the DLL circuit 21 is not ended even if the retry number exceeds the preset number, the operation of stopping the apparatuses (transmitting apparatus 4 and receiving apparatus 5) is enabled supposing that there is some breakdown in the apparatuses themselves. For this purpose, the retry number counter 42 is provided within the control portion 41 in this example.

EXAMPLE 4

Figure 8:
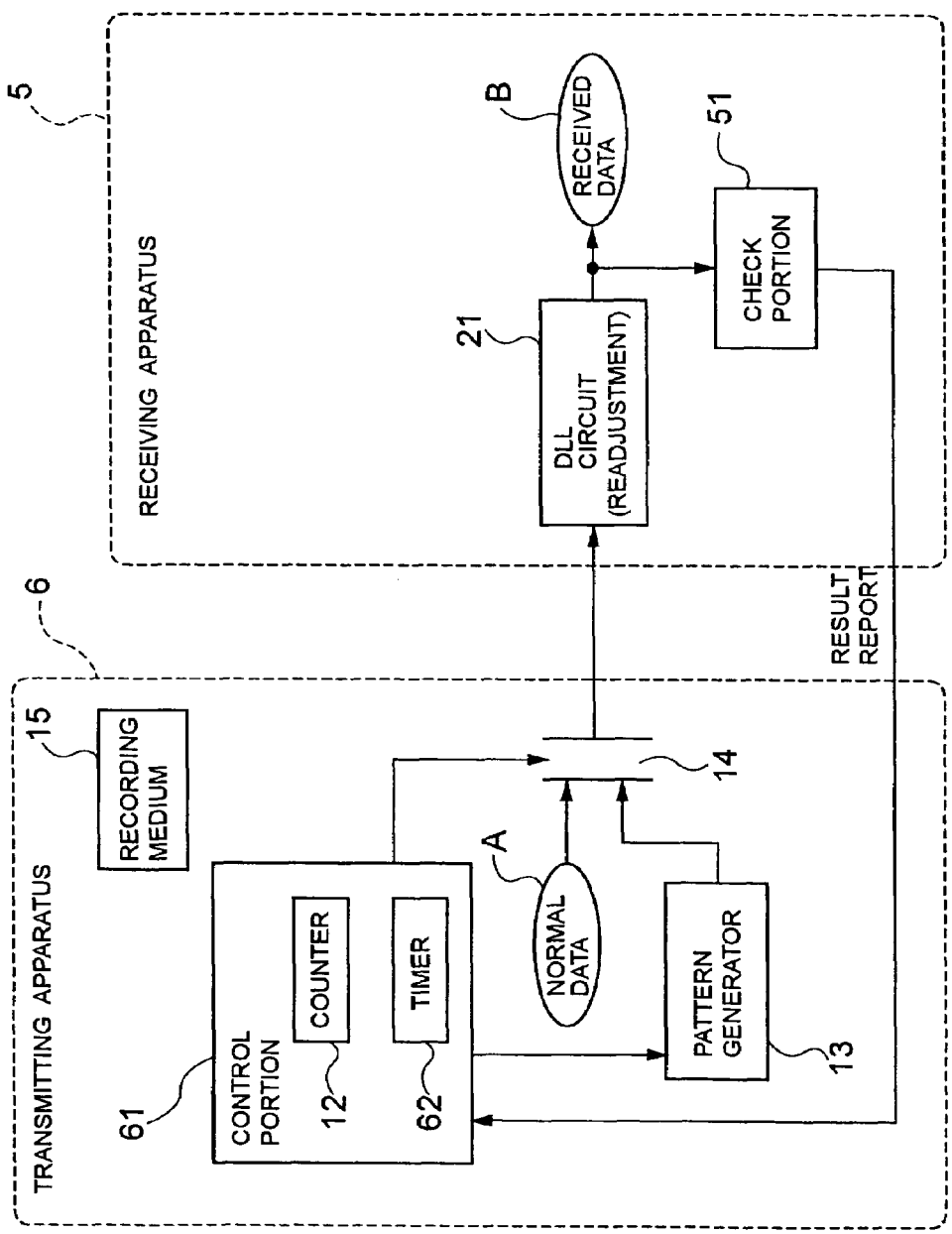
FIG. 8 is a block diagram showing a configuration example of the data transfer system in a fourth example of the invention.

FIG. 8 is a block diagram showing a configuration example of the data transfer system in a fourth example of the invention. In FIG. 8, the data transfer system in the fourth example of the invention has the same configuration as the data transfer system in the third example of the invention as shown in FIG. 6, except that a monitoring timer 62 is installed within a control portion 61, and there is a mechanism of sending the readjustment pattern again unless the result report is received from the receiving apparatus 5 within a specified time. In FIG. 8, the same components as in FIG. 6 are designated by the same numerals. The operation of the same components is the same as in the third example of the invention.

In the third example of the invention, the selector 14 is switched after the result report is accepted from the check portion 51. Therefore, if the result report is not accepted, the no operation state continues for a long time.

To avoid such a situation, the monitoring timer 62 is provided within the control portion 61 in the fourth example of the invention. This monitoring timer 62 continues to count up during the readjustment of the DLL circuit 21. Since the readjustment of the DLL circuit 21 is performed by sending the pattern, the timing of accepting the result report is predicted.

When the monitoring timer 62 continues to count up over this predicted timing, the readjustment for the DLL circuit 21 is retried, because it is considered that the readjustment of the DLL circuit 21 fails. Herein, the preset predicted timing specified may be changed.

Figure 9:
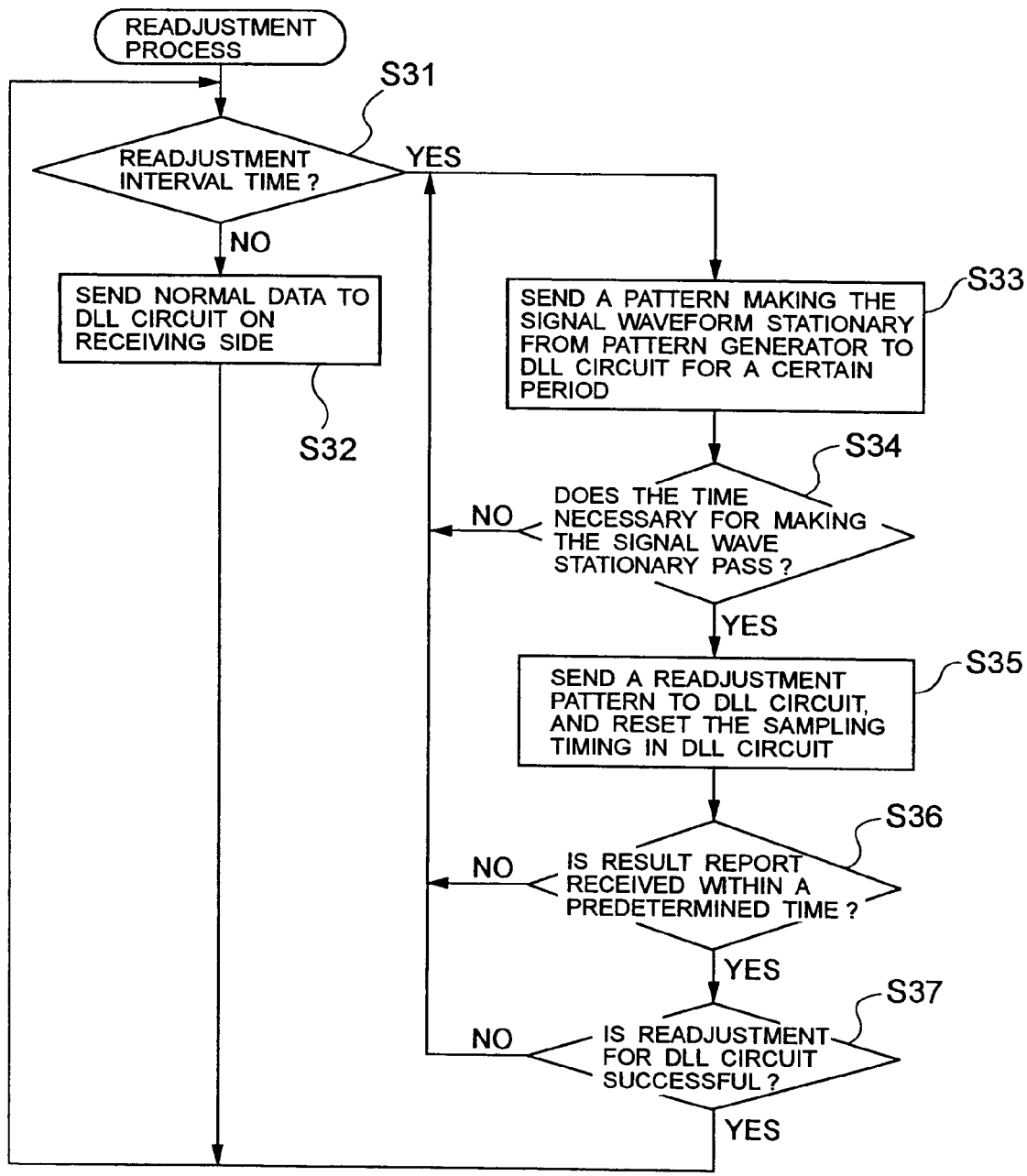
FIG. 9 is a flowchart showing the readjustment process of sampling time in the fourth example of the invention.

FIG. 9 is a flowchart showing the readjustment process of sampling time in the fourth example of the invention. Referring to FIGS. 8 and 9, the readjustment process of sampling time in the fourth example of the invention will be described below. However, the steps S31 to S35 and S37 in FIG. 9, which are the same as the steps S21 to S26 in FIG. 7, are not described here. Also, the configuration of the control portion 61 is the same as that of the control portion 11 in the first example of the invention as shown in FIG. 2.

If the monitoring timer 62 continues to count up beyond the predicted timing, the control portion 61 retries the readjustment for the DLL circuit 21 (step S33 in FIG. 9), because it is considered that the readjustment for the DLL circuit 21 fails (step S36 in FIG. 9).

In this example, the monitoring timer 62 has an additional function of detecting a time-over of the result report from the check portion 51, whereby the check of the check portion 51 is simplified. That is, there is a merit that the logic of the check portion 51 is simplified by introducing the monitoring timer 62.

EXAMPLE 5

Figure 10:
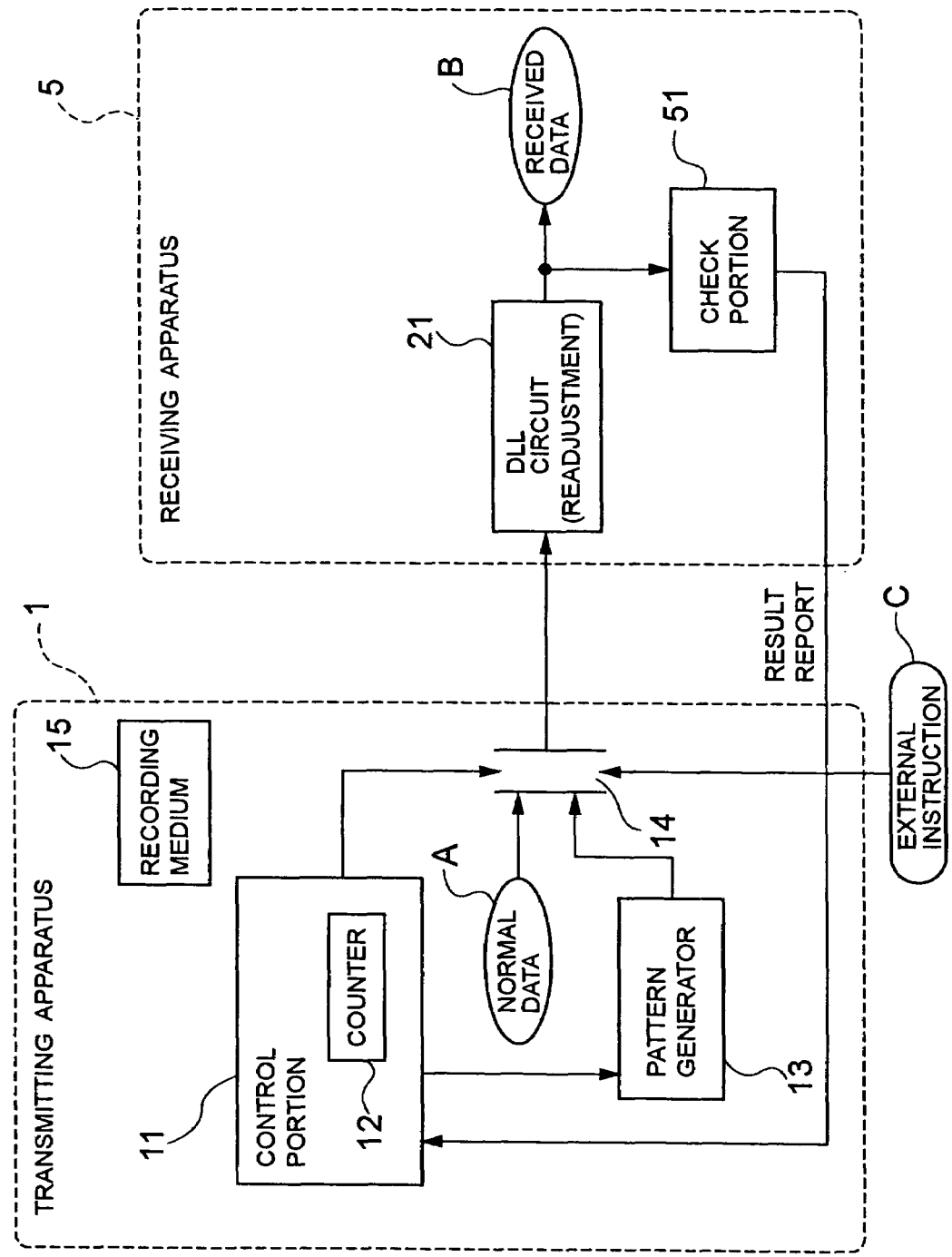
FIG. 10 is a block diagram showing a configuration example of the data transfer system in a fifth example of the invention.

FIG. 10 is a block diagram showing a configuration example of the data transfer system in a fifth example of the invention. In FIG. 10, the data transfer system in the fifth example of the invention has the same configuration as the data transfer system in the third example of the invention as shown in FIG. 6, except that the selector 14 can switch the normal data A and the output of the pattern generator 13 in accordance with an external instruction C. In FIG. 10, the same components as in FIG. 6 are designated by the same numerals. The operation of the same components is the same as in the third example of the invention. However, the control portion 11 does not have the retry number counter 42 internally, unlike the third example of the invention.

That is, in this example, the readjustment for the DLL circuit 21 is performed at arbitrary timing in accordance with an external instruction C, whereby the readjustment for the DLL circuit 21 can be inhibited.

The readjustment for the DLL circuit 21 interrupts the normal operation to lower the performance, and should not be performed, if possible. Thus, a mode of inhibiting the readjustment is added in this example. This mode is implemented by directing the selector 14 to the normal data A at any time, irrespective of the counter.

Figure 11:
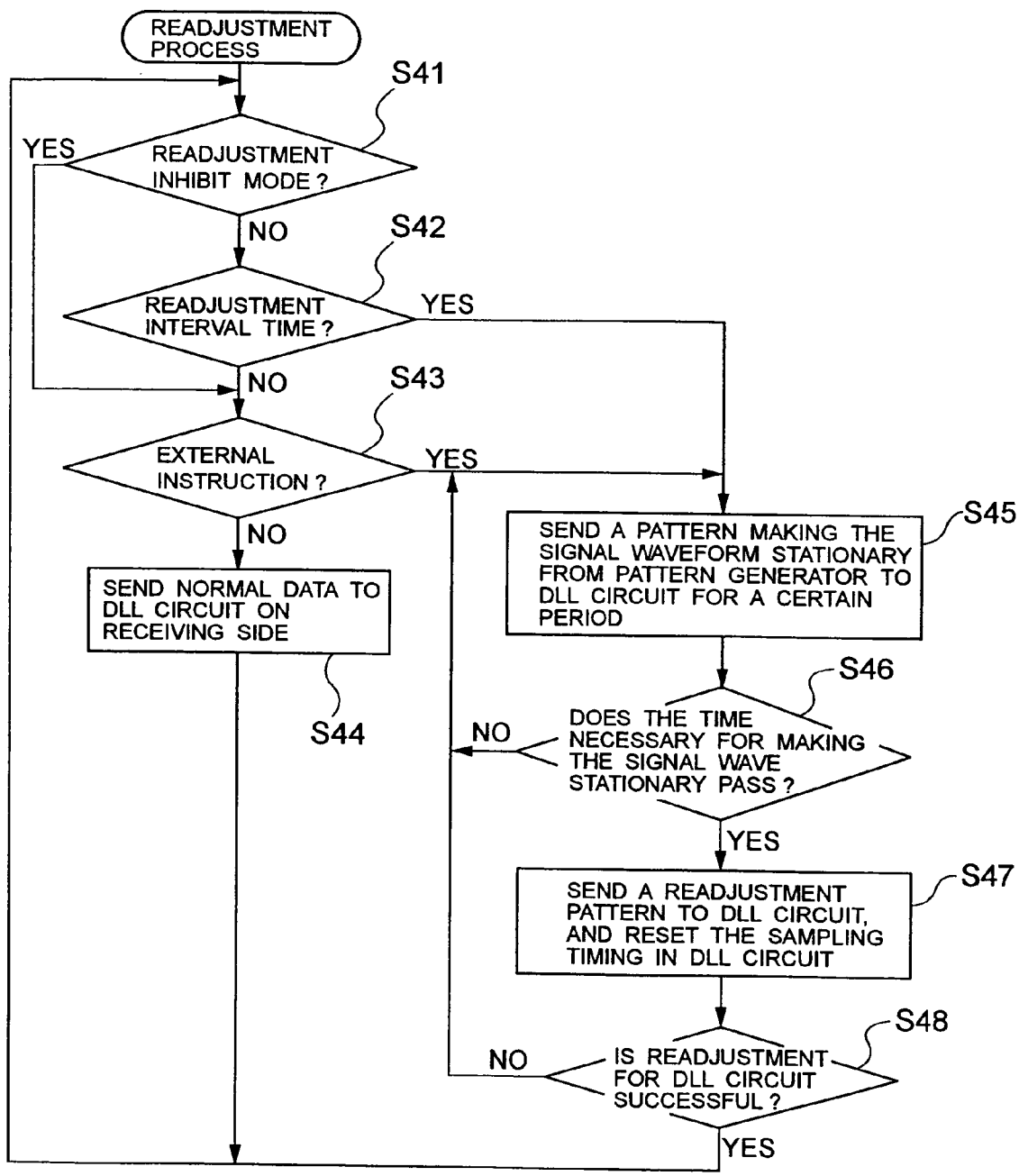
FIG. 11 is a flowchart showing the readjustment process of sampling time in the fifth example of the invention.

FIG. 11 is a flowchart showing the readjustment process of sampling time in the fifth example of the invention. Referring to FIGS. 10 and 11, the readjustment process of sampling time in the fifth example of the invention will be described below. However, the steps S42, and S44 to S48 in FIG. 11, which are the same as the steps S21 to S26 in FIG. 7, are not described here.

In this example, when not in a readjustment inhibit mode (step S41 in FIG. 11), if the readjustment interval time for the DLL circuit 21 occurs (step S42 in FIG. 11) or an external instruction C is input (step S43 in FIG. 11), the pattern generator 13 sends a pattern for making the signal waveform the stationary wave for a necessary period, thereby making the readjustment of sampling time (step S45 in FIG. 11).

In this manner, a function of making the readjustment in accordance with an external instruction C is provided in this example, whereby the readjustment is performed even when the readjustment is inhibited. Also, in this example, when an initial adjustment instruction such as turning on the power is accepted, the sampling timing adjustment can be started.

EXAMPLE 6

Figure 12:
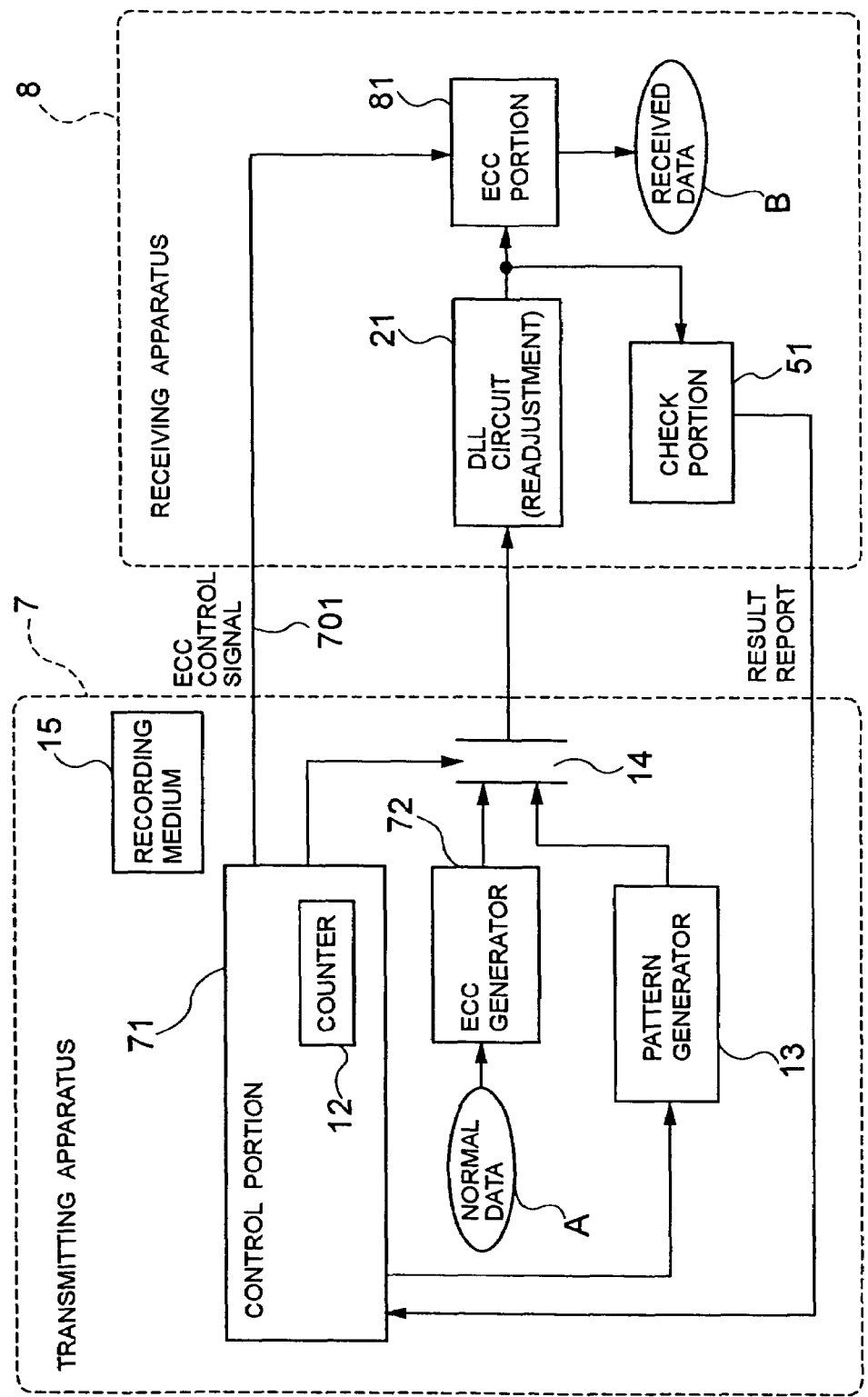
FIG. 12 is a block diagram showing a configuration example of the data transfer system in a sixth example of the invention.

FIG. 12 is a block diagram showing a configuration example of the data transfer system in a sixth example of the invention. In FIG. 12, the data transfer system in the sixth example of the invention has the same configuration as the data transfer system in the third example of the invention as shown in FIG. 6, except that an ECC (Error Correction Coding) generator 72 is provided, and an ECC portion 81 is provided in the receiving apparatus 8. In FIG. 12, the same components as in FIG. 6 are designated by the same numerals. The operation of the same components is the same as in the third example of the invention. However, a control portion 71 does not have the retry number counter 42 internally, unlike the third example of the invention.

In the sixth example of the invention, the bit error at the time of data transfer is corrected with ECC, whereby the reliability of data transfer is further enhanced. That is, in this example, the ECC generator 72 is provided in the transmitting apparatus 7, and the ECC portion 81 is provided in the receiving apparatus 8.

In the above configuration, the error at the readjustment and the bit error of the normal data A are detected by the ECC portion 81. However, since the received data may be indefinite during the readjustment for the DLL circuit 21, it is unnecessary to make the ECC check purposely. Rather, to perform the DLL readjustment, the ECC check must be suppressed during the readjustment of the DLL circuit.

Therefore, the control portion 71 controls the presence or absence of the ECC check by outputting an ECC control signal 701 to the ECC portion 81. An advantage of adding the ECC control signal 701 is that the readjustment for the DLL circuit 21 is not affected, even if an uncorrectable error occurs during the readjustment for the DLL circuit 21, whereby a wasteful error detection is suppressed.

Figure 13:
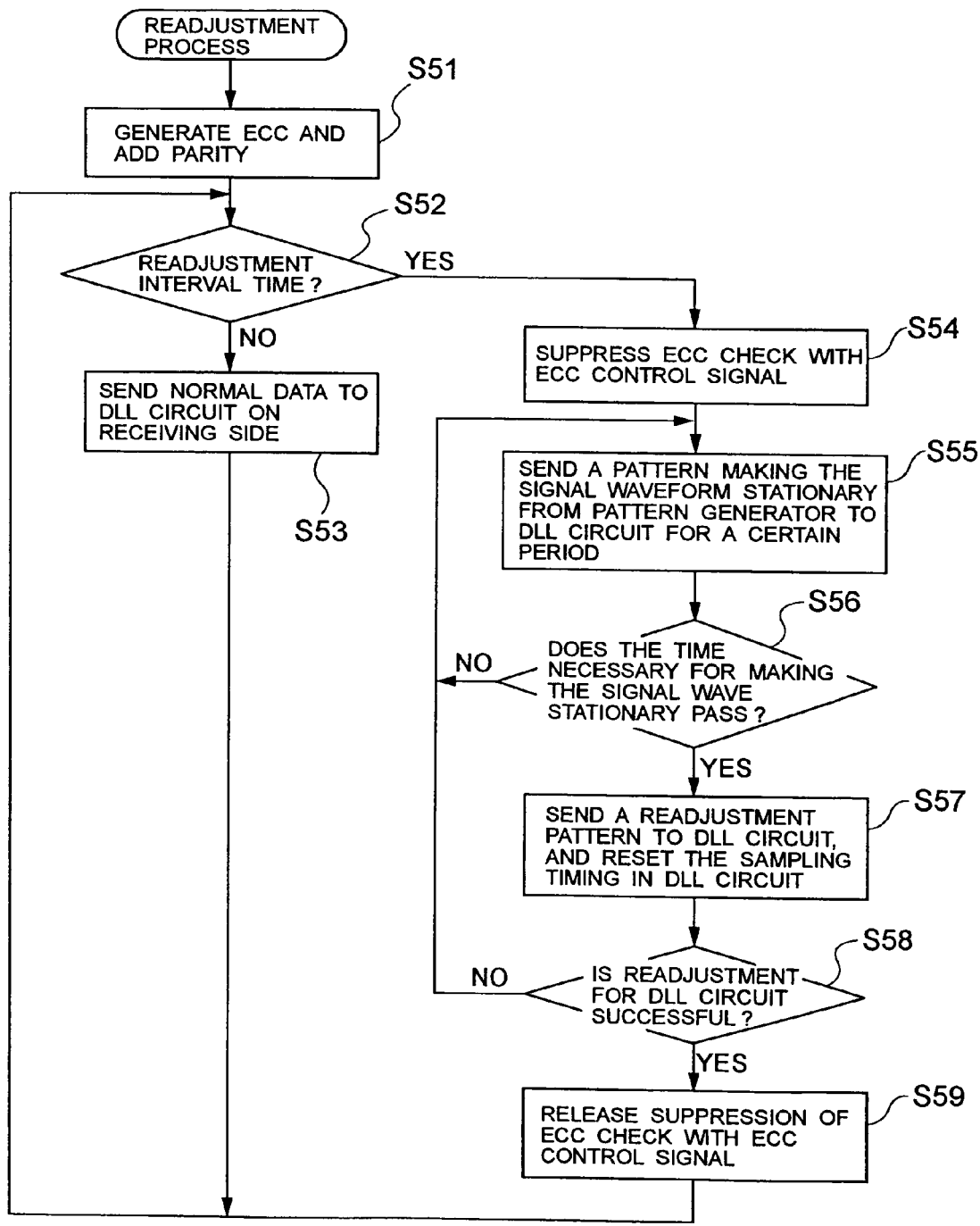
FIG. 13 is a flowchart showing the readjustment process of sampling time in the sixth example of the invention.

FIG. 13 is a flowchart showing the readjustment process of sampling time in the sixth example of the invention. Referring to FIGS. 12 and 13, the readjustment process of sampling time in the sixth example of the invention will be described below. However, the steps S52, S53, and S55 to S58 in FIG. 13, which are the same as the steps S21 to S26 in FIG. 7, are not described here.

In this example, first of all, an ECC is generated by the ECC generator 72, and the parity is added to the normal data A (step S51 in FIG. 13). Thereafter, in this example, when the readjustment for the DLL circuit 21 is not performed (step S52 in FIG. 13), the normal data A is transmitted to the DLL circuit 21 in the receiving apparatus 8 (step S53 in FIG. 13).

On the contrary, in this example, when the readjustment for the DLL circuit 21 is performed (step S52 in FIG. 13), the ECC check of the ECC portion 81 is suppressed by an ECC control signal 701 (step S54 in FIG. 13). The pattern generator 13 sends out a pattern for making the signal waveform the stationary wave for a certain period required to be stationary, thereby making the readjustment of sampling time (step S55 in FIG. 13).

Also, in this example, if the readjustment for the DLL circuit 21 is success (step S58 in FIG. 13), the suppressed ECC check for the ECC portion 81 is released by the ECC control signal 701 (step S59 in FIG. 13).

In this manner, in this example, the normal data A to which the ECC is added is transmitted at the period except during the readjustment for the DLL circuit 21, whereby the reliability of data transfer is further enhanced without making wasteful ECC check during the readjustment for the DLL circuit 21.

EXAMPLE 7

Figure 14:
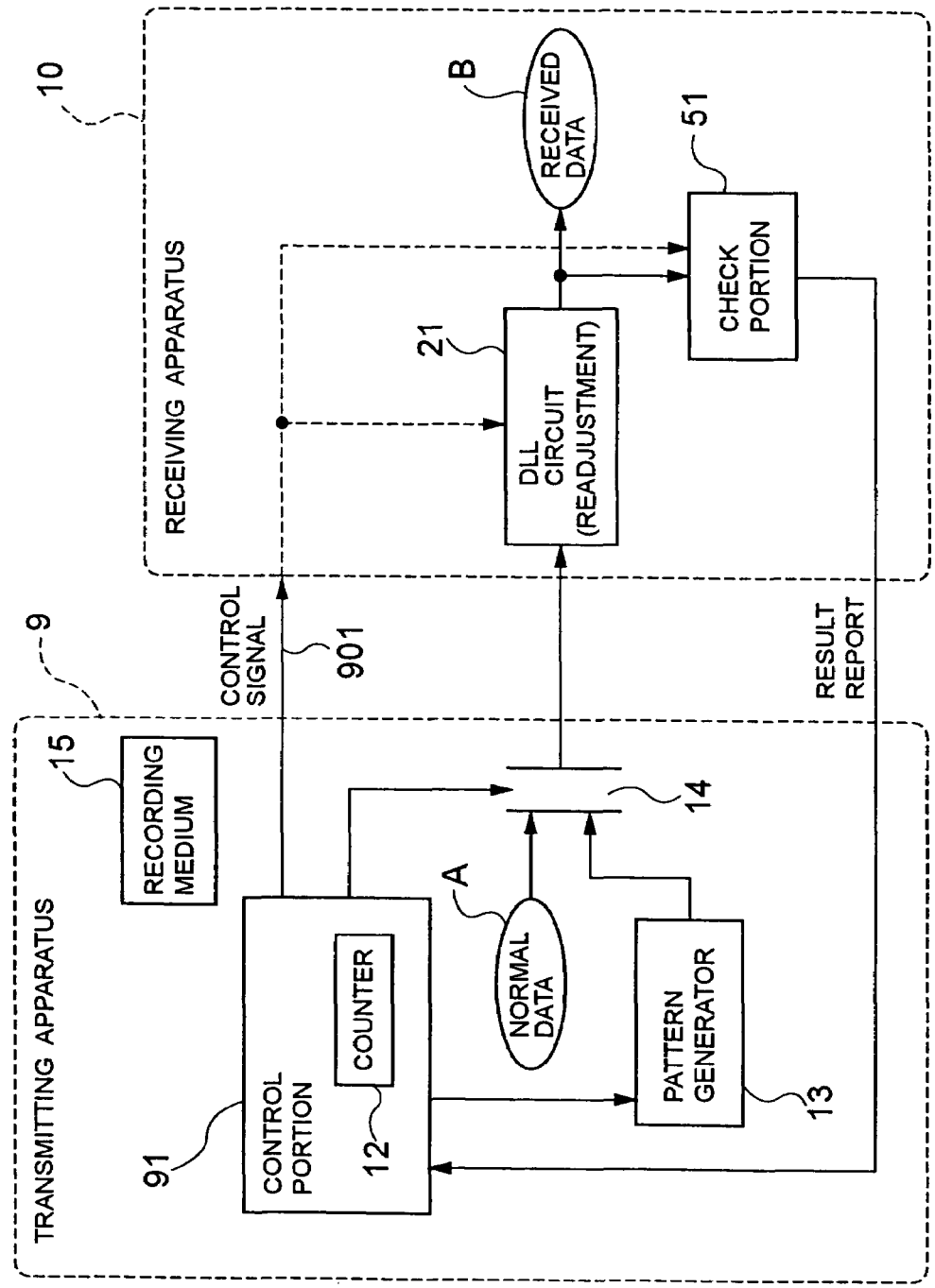
FIG. 14 is a block diagram showing a configuration example of the data transfer system in a seventh example of the invention.

FIG. 14 is a block diagram showing a configuration example of the data transfer system in a seventh example of the invention. In FIG. 14, the data transfer system in the seventh example of the invention has the same configuration as the data transfer system in the fifth example of the invention as shown in FIG. 10, except that a control portion 91 controls the DLL circuit 21 and the check portion 51 by sending a control signal 901 to the receiving apparatus 10. In FIG. 14, the same components as in FIG. 10 are designated by the same numerals. The operation of the same components is the same as in the third example of the invention.

In FIG. 14, unlike FIG. 10, the external instruction C is not shown. In this example, an interface dedicated for the control signal 901 is provided, whereby the interface for normal data A and readjustment pattern can be shared.

In FIG. 14, the control portion 91 sends the control signal 901 to the receiving apparatus 10 to control the DLL circuit 21 and the check portion 51 in the receiving apparatus 10. With this control signal 901, the receiving apparatus 10 easily discriminates whether the data transmitted from the transmitting apparatus 9 is the normal data A or the readjustment pattern. And the check method of the check portion 51 may be changed, or the check inhibited, whereby the time for receiving the result report is omitted, contributing to the improved performance.

Herein, when the interface for the control signal 901 is added, another interface with high reliability may be employed for the channel, thereby dispensing with the readjustment for the channel. Also, another interface may be shared by adding the interface for the control signal 901.

Figure 15:
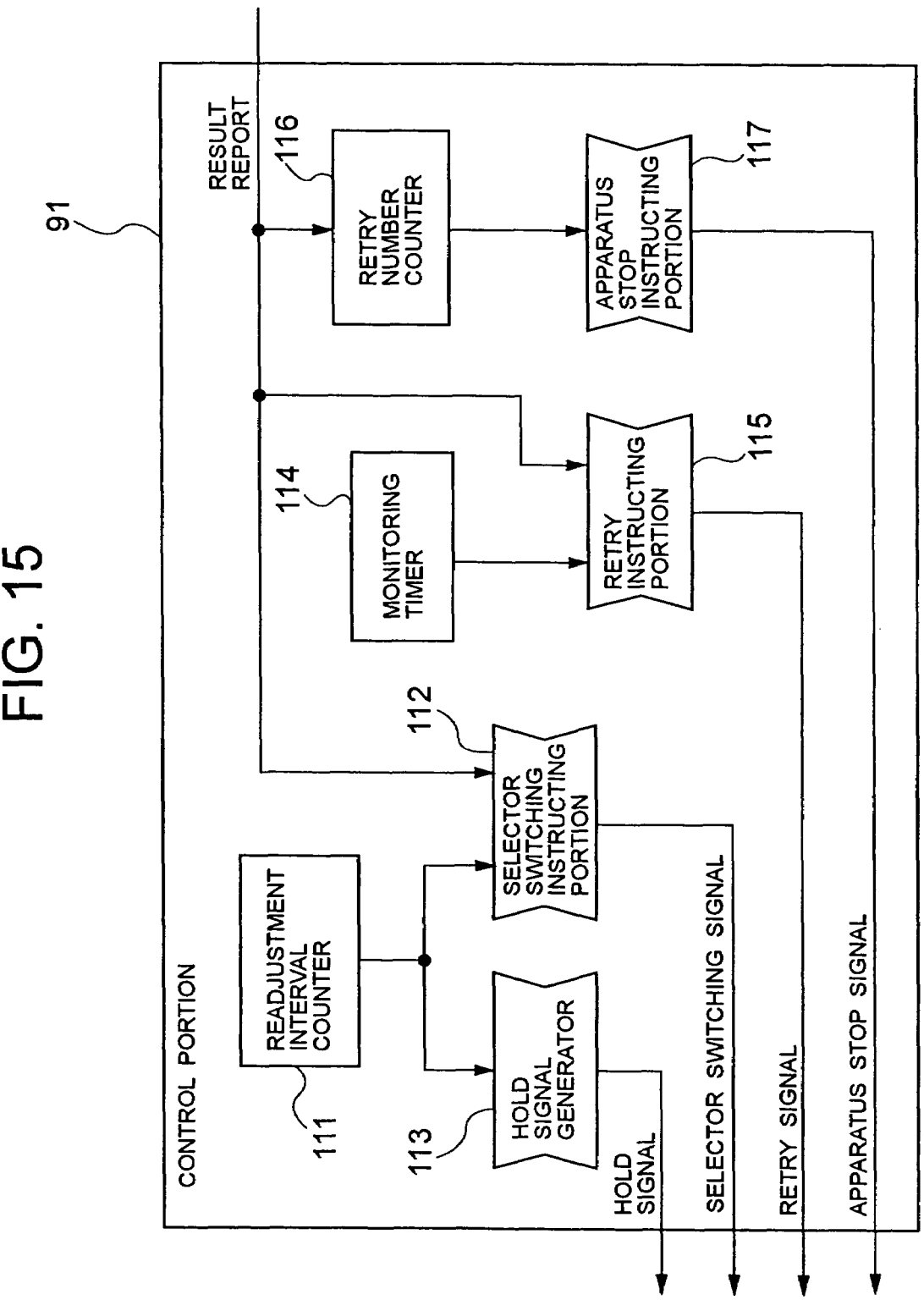
FIG. 15 is a block diagram showing the configuration of the control portion within the transmitting apparatus in the seventh example of the invention.

FIG. 15 is a block diagram showing the configuration of a control portion within the transmitting apparatus in the seventh example of the invention. In FIG. 15, the control portion 91 comprises a readjustment interval counter 111, a selector switching instructing portion 112, a hold signal generator 113, a monitoring timer 114, a retry instructing portion 115, a retry number counter 116 and an apparatus stop instructing portion 117.

The readjustment interval counter 111 (corresponding to the counter 12 in FIG. 14) counts the preset readjustment interval, and notifies its count value to the selector switching instructing portion 112 and the hold signal generator 113. The selector switching instructing portion 112 generates a selector switching signal to the selector 14, based on the count value from the readjustment interval counter 111 and the result report from the receiving apparatus 2.

The hold signal generator 113 generates a hold signal based on the count value from the readjustment interval counter 111. The retry instructing portion 115 generates a retry signal, based on the time information from the monitoring timer 114 and the result report from the receiving apparatus 2. The retry number counter 116 counts the retry number, based on the result report from the receiving apparatus 2. The apparatus stop instructing portion 117 generates an apparatus stop signal, based on the retry number from the retry number counter 116.

In this example, the control portion 91 having the above configuration outputs the selector switching signal from each circuit to the selector 14, the hold signal, the retry signal, and the apparatus stop signal, thereby implementing the operation of the first to sixth examples as described above.

EXAMPLE 8

Figure 16:
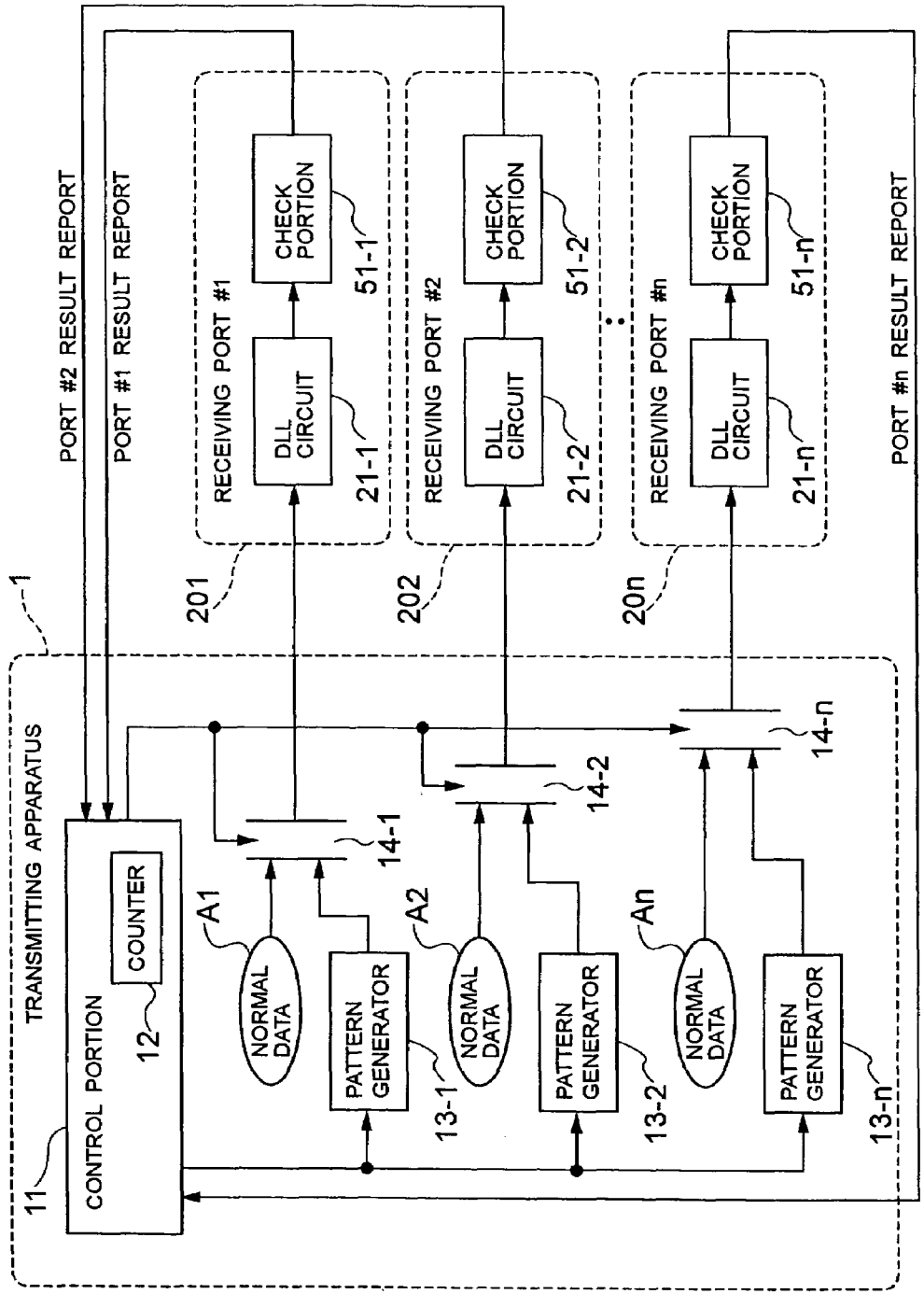
FIG. 16 is a block diagram showing a configuration example of the data transfer system in an eighth example of the invention.

FIG. 16 is a block diagram showing a configuration example of the data transfer system in an eighth example of the invention. In FIG. 16, the readjustment for the DLL circuit is performed in the receiving apparatus having many ports branched such as a shared memory.

In this example, the single control portion 11 with the counter 12 is provided in the transmitting apparatus 1. However, the pattern generators 13-1 to 13-$n$ corresponding to the receiving ports 201 to 20$n$ and the check portions 51-1 to 51-$n$ corresponding to the receiving ports 201 to 20$n$ are provided.

In the configuration as shown in FIG. 16, the interfaces for the normal data A1 to An and the pattern generators 13-1 to 13-$n$ corresponding to the receiving ports 201-20$n$ are provided, but one counter 12 is only provided to enable the selectors 14-1 to 14-$n$ to switch the pattern generators 13-1 to 13-$n$ for all the receiving ports 201 to 20$n$.

The check is performed for each of the receiving ports 201 to 20$n$. The result reports (port #1 result report to port #$n$ result report) are returned individually. And each of the receiving ports 201 to 20$n$ in which the readjustment for the DLL circuits 21-1 to 21-$n$ is normally ended returns to the normal operation (it is unnecessary for all the receiving ports #1 to #$n$ to wait until all the receiving ports 201 to 20$n$ normally end the readjustment for the DLL circuits 21-1 to 21-$n$).

At the time when all the receiving ports 201 to 20$n$ end the readjustment for the DLL circuits 21-1 to 21-$n$, the counter 12 is reset and starts to count up. Hence, the readjustment for the DLL circuits 21-1 to 21-$n$ is started at once for all the receiving ports 201 to 20$n$, but ended for each of the receiving ports 201 to 20$n$, thereby preventing a lower performance.

Figure 17:
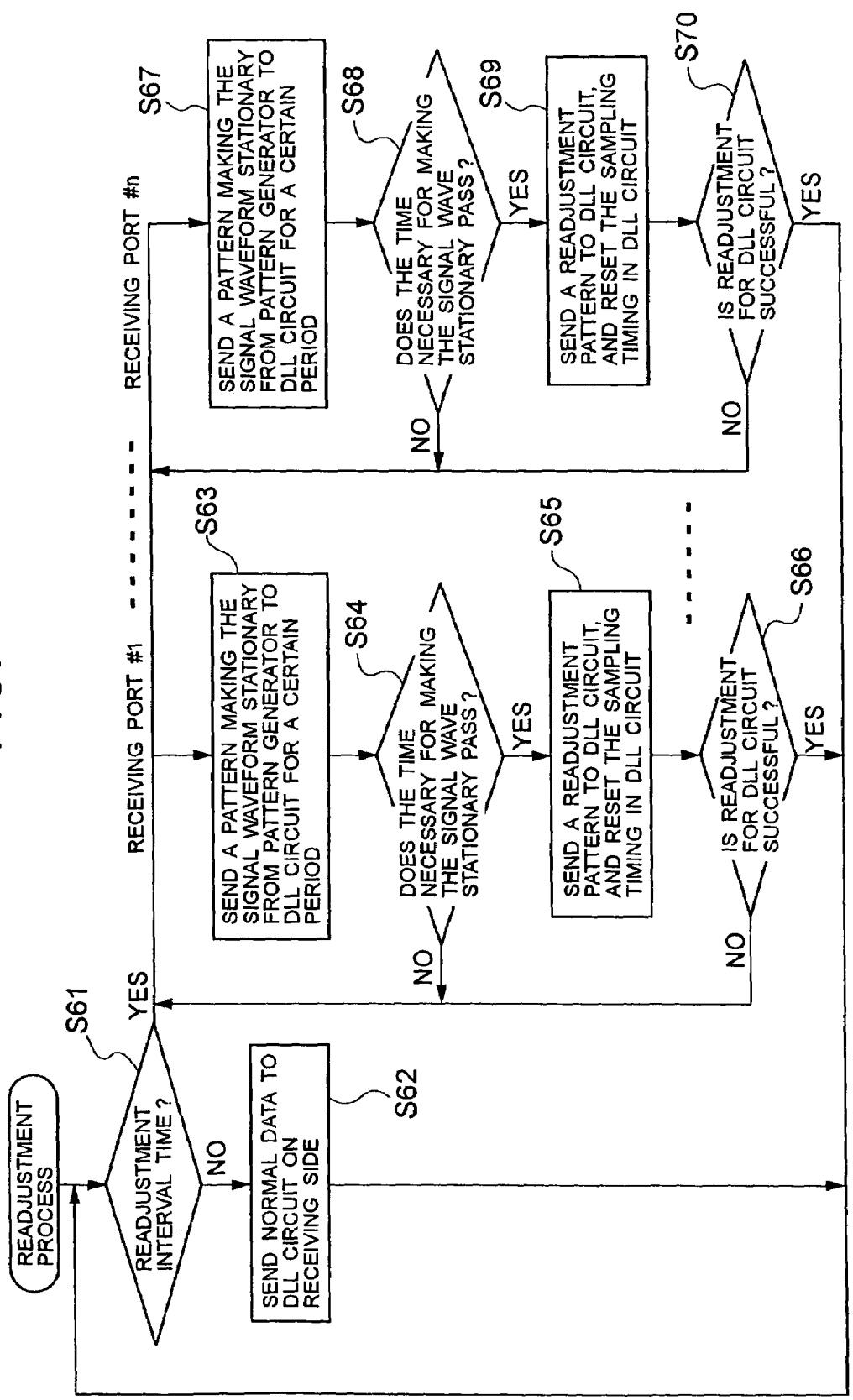
FIG. 17 is a flowchart showing the readjustment process of sampling time in the eighth example of the invention.

FIG. 17 is a flowchart showing the readjustment process of sampling time in the eighth example of the invention. Referring to FIGS. 16 and 17, the readjustment process of sampling time in the eighth example of the invention will be described below. However, the steps S61 to S65, and S67 to S69 in FIG. 17, which are the same as the steps S1 to S5 in FIG. 3, are not described here.

In this example, it is determined whether the transmitting apparatus 1 resumes the normal operation or the readjustment is retried, whereby the normal operation is resumed or the readjustment is retried in each of the receiving ports 201 to 20$n$ (steps S66 and S70 in FIG. 17). Thereby, in this example, the readjustment for the DLL circuits 21-1 to 21-$n$ is started at once for all the receiving ports 201 to 20n, but may be ended for each of the receiving ports 201 to 20n.

In the configuration as shown in FIG. 16, plural receiving ports 201 to 20n reside for one transmitting apparatus 1. Conversely, in the case where one receiving apparatus exists for plural transmitting apparatuses, the readjustment for the DLL circuit is also permitted. In this case, if the single control portion 11 exists in the receiving side, the same control operation as above is made.

That is, plural DLL circuits corresponding to plural transmitting apparatuses are disposed in the receiving apparatus. The readjustment patterns are transmitted from the plural transmitting apparatuses to the corresponding DLL circuits, whereby the readjustment for the DLL circuits is enabled. In this case, the control portion 11 is disposed in the receiving apparatus. Thereby, the readjustment for plural transmitting apparatuses is started, every time the counter within the control portion 11 counts a predetermined period. The control portion 11 may be disposed in each of the plural transmitting apparatuses.

EXAMPLE 9

Figure 18:
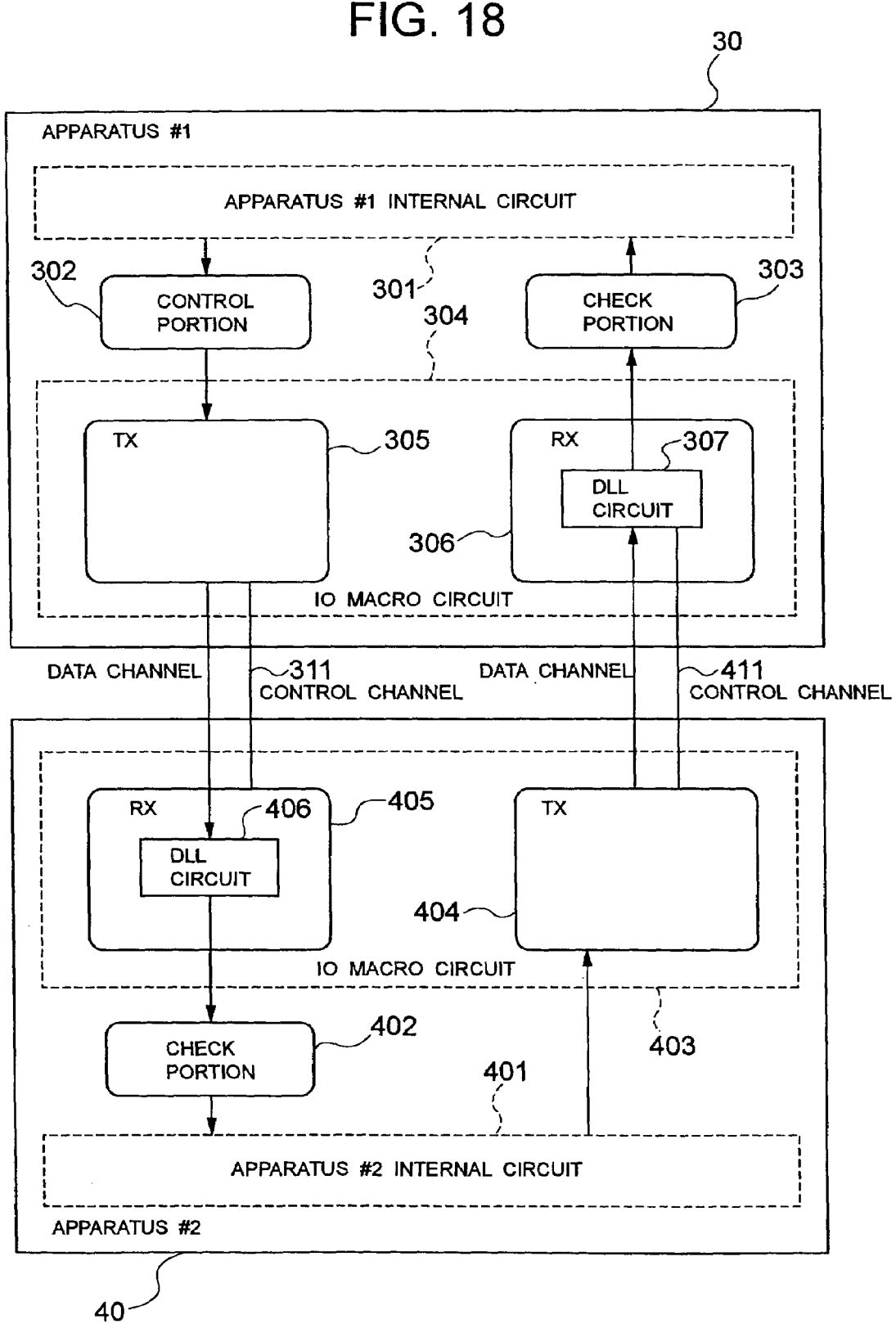
FIG. 18 is a block diagram showing a configuration example of the data transfer system in a ninth example of the invention.

FIG. 18 is a block diagram showing a configuration example of the data transfer system in a ninth example of the invention. In FIG. 18, the readjustment for the DLL circuits 307 and 406 is enabled in a bidirectional transfer between a CPU and a memory. That is, the readjustment patterns for the DLL circuits 307 and 406 are transmitted and received on both the paths from apparatus (#1) 30 to apparatus (#2) 40, and apparatus (#2) 40 to apparatus (#1) 30, thereby readjusting the sampling time.

The apparatus (#1) 30 is composed of an apparatus #1 internal circuit 301, a control portion 302, a check portion 303, and an IO (input/output) macro circuit 304, which comprises a TX (transmitter) 305, and an RX (receiver) 306 having a DLL circuit 307. The apparatus (#2) 40 is composed of an apparatus #2 internal circuit 401, a check portion 402, and an IO macro circuit 403, which comprises a TX 404 and an RX 405 having a DLL circuit 406.

As described above, in the data transfer system in this example, the control portion 302 is provided for the apparatus (#1) 30 only, and the check portions 303 and 402 are provided for the apparatuses (#1, #2) 30 and 40, respectively. The DLL circuits 307 and 406 are disposed within the RXes 306 and 405, respectively. The configuration of the control portion 302 is the same as that of the control portion 91 as shown in FIG. 15.

Referring to FIG. 18, the readjustment for the DLL circuits 307 and 406 at the time of bidirectional transfer in the data transfer system in this example will be described below. At a predetermined time, a readjustment start instruction for the DLL circuits 307 and 406 is sent from the control portion 302 of the apparatus (#1) 30 to the apparatus (#2) 40. Thereafter, sending the readjustment pattern is started in the directions from apparatus (#1) 30 to apparatus (#2) 40 and from apparatus (#2) 40 to apparatus (#1) 30 in this example.

In this example, errors are detected in the check portions 303 and 402, the detection results being sent to the control portion 302. In this example, if the readjustment for the DLL circuits 307 and 406 in the directions from apparatus (#1) 30 to apparatus (#2) 40 and from apparatus (#2) 40 to apparatus (#1) 30 is ended, the normal data sending operation is resumed. In this example, if the readjustment for the DLL circuits 307 and 406 fails, the control portion 302 instructs to send the readjustment pattern once again, and the readjustment is retried until it succeeds.

Figure 19:
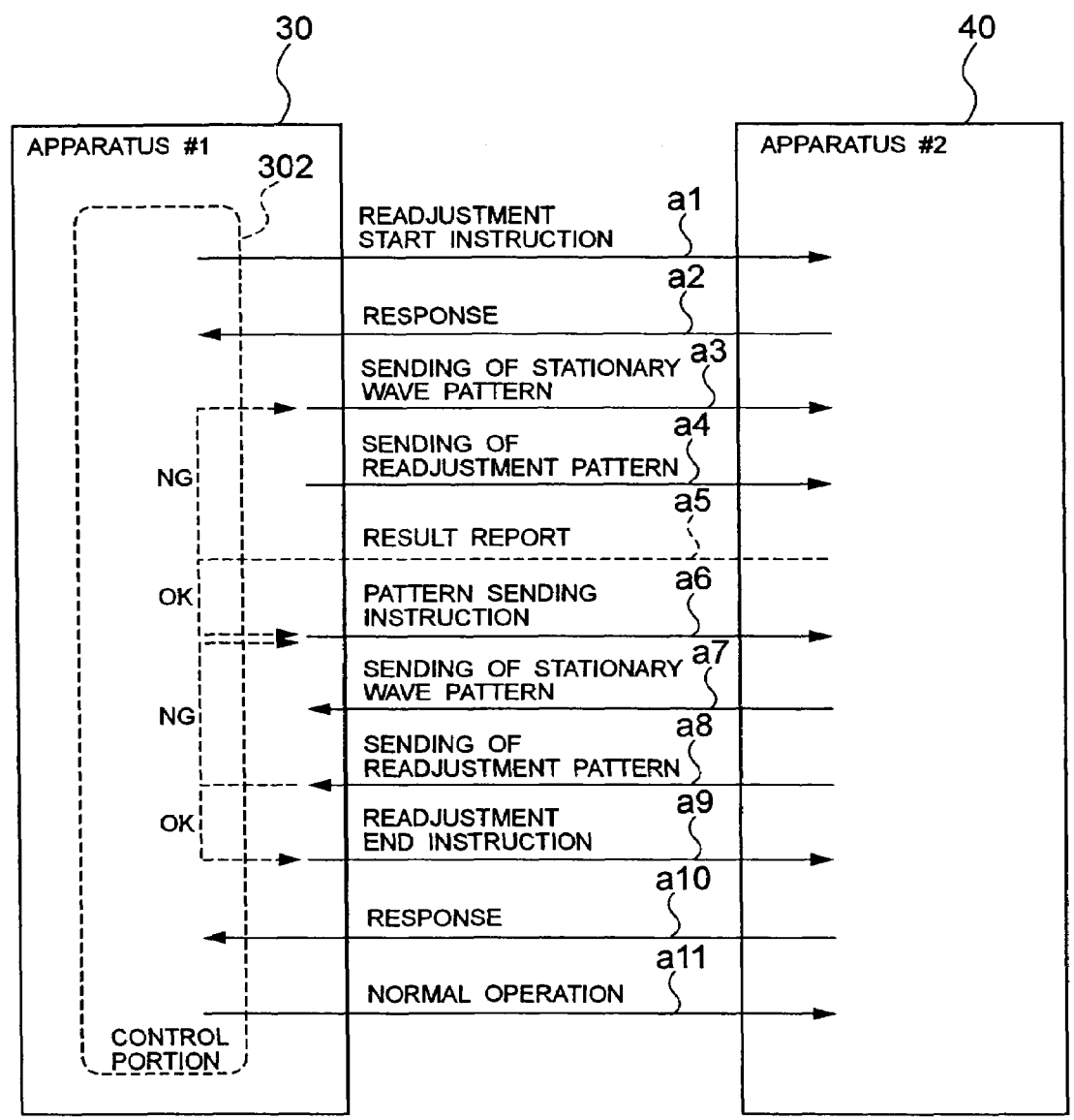
FIG. 19 is a sequence chart showing an operation example of a data transfer system in the ninth example of the invention.
Figure 20:
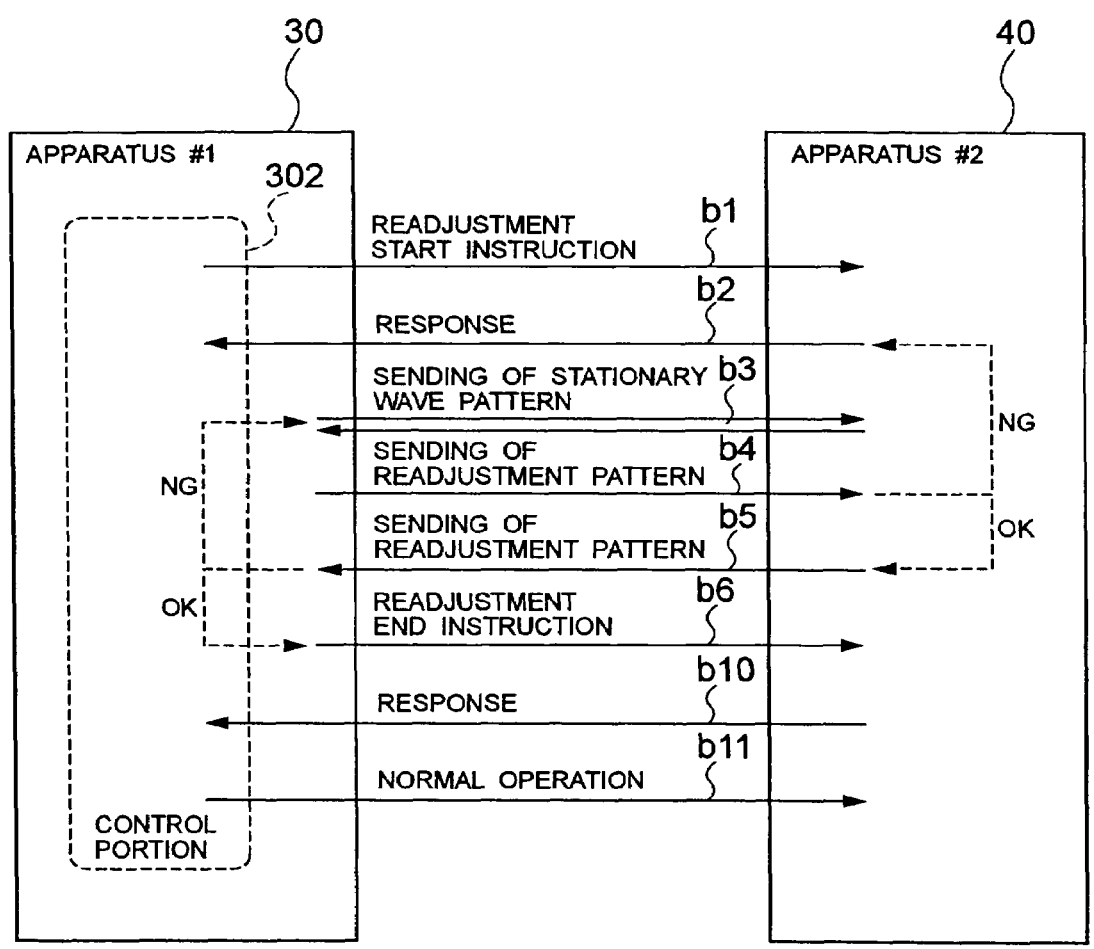
FIG. 20 is a sequence chart showing another operation example of the data transfer system in the ninth example of the invention.

FIG. 19 is a sequence chart showing an operation example of the data transfer system in the ninth example of the invention. FIG. 20 is a sequence chart showing another operation example of the data transfer system in the ninth example of the invention. Referring to FIGS. 18 to 20, the operation of the data transfer system in the ninth example of the invention will be described below. In this example, the control channels 311 and 411 are provided to share the interface for the normal data, readjustment pattern and result report.

In a case #1 of the operation example of the data transfer system in this example, first of all, the readjustment for the DLL circuit 406 in the direction from apparatus (#1) 30 to apparatus (#2) 40 is ended (a1 to a5 in FIG. 19), and then the readjustment for the DLL circuit 307 in the direction from apparatus (#2) 40 to apparatus (#1) 30 is ended (a6 to a8 in FIG. 19), as shown in FIG. 19.

During the readjustment from apparatus (#1) 30 to apparatus (#2) 40, the result report is normally received, because the normal data can be transferred from apparatus (#2) 40 to apparatus (#1) 30. Accordingly, in the case of readjusting the DLL circuits 307 and 406 in one direction each time, the normal operation is enabled in one-way transfer, whereby the readjustment for the DLL circuits 307 and 406 is performed with high reliability. However, since the readjustment for the DLL circuits 307 and 406 is performed in one direction each time, it takes a long time and the performance is degraded.

On the contrary, in a case #2 of the operation example of the data transfer system in this example, the readjustment for the DLL circuits 307 and 406 in the directions from apparatus (#1) 30 to apparatus (#2) 40 and from apparatus (#2) 40 to apparatus (#1) 30 is performed at the same time, thereby improving the performance, as shown in FIG. 20. In FIG. 20, the stationary wave patterns are sent in the directions from apparatus (#1) 30 to apparatus (#2) 40 and from apparatus (#2) 40 to apparatus (#1) 30 at the same time (b3 in FIG. 20). However, since sending the readjustment pattern is made in shorter time than sending the stationary wave pattern, the readjustment pattern is sent separately in the directions from apparatus (#1) 30 to apparatus (#2) 40 and from apparatus (#2) 40 to apparatus (#1) 30, and the error result of the apparatus (#2) 40 is informed separately to the apparatus (#1) 30 (b4, b5 in FIG. 20).

In the case #2, since the result report is transferred through the readjustment interface, the report can not be received unless the readjustment is normally ended. Therefore, a mechanism for determining the operation from the check result within the apparatus (#2) 40 is needed, as shown in FIG. 20. Also, the higher speed is expected by omitting a response from the apparatus (#2) 40, but the reliability is degraded.

In this invention, it is possible to maintain the synchronization of the data during the operation of the apparatus by making the periodical readjustment for the DLL circuits 21, 21-1 to 21-n, 307 and 406. The readjustment for the DLL circuits 21, 21-1 to 21-n, 307 and 406 is periodically performed, causing a lower performance. However, the lower performance can be suppressed to the utmost by appropriately specifying the readjustment interval, the pattern sending period, the hold period, and the monitoring timer interval. The above examples are applicable in combination.

Since this readjustment control is applicable to the apparatus for bidirectional transfer or multi-port transfer, this invention is carried out in various apparatuses.

What is claimed is:

1. A data transfer system comprising a transmitting apparatus, and a receiving apparatus for maintaining synchronization of data from said transmitting apparatus, using a DLL (Delay Locked Loop) circuit, wherein the readjustment of said DLL circuit is periodically performed after a transfer of normal data has been initiated;

said data transfer system further comprising a selector for switching normal data and readjustment data to be sent to said receiving apparatus according to when said readjustment of said DLL circuit is periodically performed.

2. The data transfer system according to claim 1, further comprising a pattern generator for generating a readjustment pattern for said DLL circuit, and control means for controlling to periodically send out the readjustment pattern from said pattern generator to said DLL circuit, wherein said DLL circuit readjusts a sampling timing of said data, using said readjustment pattern.

3. The data transfer system according to claim 2, further comprising a counter for counting a readjustment interval of said DLL circuit, wherein said control means controls the switching of said selector to periodically send out said readjustment pattern to said DLL circuit, every time said readjustment interval is indicated from said counter.

4. The data transfer system according to claim 3, wherein sending said normal data to said receiving apparatus is inhibited during the readjustment of said DLL circuit.

5. The data transfer system according to claim 2, further comprising check means for detecting the readjustment result of said DLL circuit in said receiving apparatus, wherein said control means returns the system to the normal operation, when the detection result of said check means is success in the readjustment of said DLL circuit, or instructs to retry the readjustment of said DLL circuit, when said detection result is failure in the readjustment of said DLL circuit.

6. The data transfer system according to claim 5, further comprising counting means for counting the retry number of readjustments of said DLL circuit in said transmitting apparatus, wherein said transmitting apparatus and said receiving apparatus are stopped, when a count value of said counting means for counting the retry number of readjustments is greater than or equal to a preset value.

7. The data transfer system according to claim 2, wherein said control means controls said transmitting apparatus and said receiving apparatus arbitrarily.

8. The data transfer system according to claim 5, further comprising a timer for monitoring the time up to receiving the detection result of said check means in said transmitting apparatus, wherein said control means instructs said retry when the time of said timer is beyond a preset time.

9. The data transfer system according to claim 1, wherein a mode for inhibiting the readjustment of said DLL circuit is settable.

10. The data transfer system according to claim 1, wherein the readjustment of said DLL circuit is performed at any timing in accordance with an external instruction.

11. The data transfer system according to claim 1, wherein said DLL circuit is adjustable at the initialization including at least the time of turning on the power of said receiving apparatus.

12. The data transfer system according to claim 3, wherein an error check for the normal data with an ECC (Error Correction Coding) is performed during the transfer of said data, and an error check for the readjustment pattern with said ECC is suppressed during the transfer of said pattern.

13. The data transfer system according to claim 1, wherein a plurality of receiving ports are connected to one said transmitting apparatus.

14. The data transfer system according to claim 1, wherein a plurality of transmitting ports are connected to one said receiving apparatus.

15. The data transfer system according to claim 1, wherein a plurality of transmitting ports and a plurality of receiving ports are connected.

16. The data transfer system according to claim 1, wherein said readjustment of said DLL circuit is performed by a DLL readjustment circuit.

17. A readjustment control method for a data transfer system comprising a transmitting apparatus, and a receiving apparatus for maintaining synchronization of data from said transmitting apparatus, using a DLL (Delay Locked Loop) circuit, said method comprising performing the readjustment of said DLL circuit periodically after a transfer of normal data has been initiated; and controlling a selector to switch normal data and readjustment data to be sent to said receiving apparatus according to when said readjustment of said DLL circuit is periodically performed.

18. The readjustment control method according to claim 17, further comprising periodically sending out a readjustment pattern to said DLL circuit in said transmitting apparatus, said readjustment pattern being acquired from a pattern generator for generating the readjustment pattern for said DLL circuit, wherein said DLL circuit readjusts a sampling timing of said data, using said readjustment pattern.

19. The readjustment control method according to claim 18, wherein periodically sending out said readjustment pattern to said DLL circuit further comprises controlling said selector to switch the normal data and said readjustment pattern to be sent to said receiving apparatus, every time said readjustment interval is indicated from a counter for counting the readjustment interval of said DLL circuit, thereby periodically sending out said readjustment pattern to said DLL circuit.

20. The readjustment control method according to claim 19, wherein sending said normal data to said receiving apparatus is inhibited during the readjustment of said DLL circuit.

21. The readjustment control method according to claim 17, wherein periodically sending out said readjustment pattern to said DLL circuit further comprises returning the system to the normal operation, when the detection result of check means for detecting the readjustment result of said DLL circuit is success in the readjustment of said DLL circuit, or instructing to retry the readjustment of said DLL circuit, when said detection result is failure in the readjustment of said DLL circuit, said check means being provided in said receiving apparatus to detect the readjustment result of said DLL circuit.

22. The readjustment control method according to claim 17, further comprising stopping said transmitting apparatus and said receiving apparatus, when a count value of counting means for counting the retry number of readjustments is greater than or equal to a preset value, said counting means being provided in said transmitting apparatus to count the retry number of readjustments of said DLL circuit.

23. The readjustment control method according to claim 18, wherein periodically sending out said readjustment pattern to said DLL circuit further comprises controlling said transmitting apparatus and said receiving apparatus arbitrarily.

24. The readjustment control method according to claim 21, wherein periodically sending out said readjustment pattern to said DLL circuit further comprises instructing said retry when the time of a timer for monitoring the time up to receiving the detection result of said check means is beyond a preset time, said timer being provided in said transmitting apparatus to monitor the time up to receiving the detection result of said check means.

25. The readjustment control method according to claim 17, wherein a mode for inhibiting the readjustment of said DLL circuit is settable.

26. The readjustment control method according to claim 17, wherein the readjustment of said DLL circuit is performed at any timing in accordance with an external instruction.

27. The readjustment control method according to claim 17, wherein said DLL circuit is adjustable at the initialization including at least the time of turning on the power of said receiving apparatus.

28. The readjustment control method according to claim 19, wherein an error check for the normal data with an ECC (Error Correction Coding) is performed during the transfer of said data, and an error check for the readjustment pattern with said ECC is suppressed during the transfer of said pattern.

29. The readjustment control method according to claim 17, wherein a plurality of receiving ports are connected to one said transmitting apparatus in said data transfer system.

30. The readjustment control method according to claim 17, wherein a plurality of transmitting ports are connected to one said receiving apparatus in said data transfer system.

31. The readjustment control method according to claim 17, wherein a plurality of transmitting ports and a plurality of receiving ports are connected in said data transfer system.

32. The readjustment control method according to claim 17, wherein said readjustment of said DLL circuit is performed by a DLL readjustment circuit.

33. A tangible computer readable medium having computer instructions for enabling a computer to perform a readjustment control method for maintaining synchronization of data in a data transfer system using a DLL (Delay Locked Loop) circuit, said data being sent from a transmitting apparatus to a receiving apparatus, said method comprising:
  periodically performing the readjustment of said DLL circuit after a transfer of normal data has been initiated; and
  controlling a selector to switch normal data and readjustment data to be sent to said receiving apparatus according to when said readjustment of said DLL circuit is periodically performed.

34. The tangible computer readable medium according to claim 33, wherein the process for periodically performing the readjustment for said DLL circuit further comprises periodically sending out a readjustment pattern to said DLL circuit, said readjustment pattern being acquired from a pattern generator for generating the readjustment pattern for said DLL circuit.

35. The tangible computer readable medium according to claim 33, wherein said readjustment of said DLL circuit is performed by a DLL readjustment circuit.

* * * * *